US011349305B2

(12) United States Patent
Mueller et al.

(10) Patent No.: US 11,349,305 B2
(45) Date of Patent: May 31, 2022

(54) ELECTRICAL WIRING DEVICE WITH WIRING DETECTION AND CORRECTION

(71) Applicant: Pass & Seymour, Inc., Syracuse, NY (US)

(72) Inventors: Brian Mueller, Cortland, NY (US); Joshua P. Haines, Marcellus, NY (US); David A. Finlay, Sr., Marietta, NY (US); Gerald R. Savicki, Jr., Canastota, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 16/861,942

(22) Filed: Apr. 29, 2020

(65) Prior Publication Data

US 2020/0343722 A1 Oct. 29, 2020

Related U.S. Application Data

(60) Provisional application No. 62/840,111, filed on Apr. 29, 2019, provisional application No. 62/840,043, filed on Apr. 29, 2019.

(51) Int. Cl.
| | | |
|---|---|---|
| *H02H 11/00* | (2006.01) | |
| *H05B 47/20* | (2020.01) | |
| *H05B 47/14* | (2020.01) | |

(52) U.S. Cl.
CPC ......... *H02H 11/003* (2013.01); *H02H 11/004* (2013.01); *H05B 47/14* (2020.01); *H05B 47/20* (2020.01)

(58) Field of Classification Search
CPC .. H02H 11/003; H02H 11/004; H02H 11/007; H05B 47/14; H05B 47/20
See application file for complete search history.

(56) References Cited

U.S. PATENT DOCUMENTS

| | | | |
|---|---|---|---|
| 9,432,298 B1* | 8/2016 | Smith | ................ H04L 49/9057 |
| 2014/0265880 A1* | 9/2014 | Taipale | ................ H05B 45/12 |
| | | | 315/158 |
| 2019/0197858 A1* | 6/2019 | Moses | ................... G05B 15/02 |

* cited by examiner

*Primary Examiner* — Abdullah A Riyami
*Assistant Examiner* — Syed M Kaiser
(74) *Attorney, Agent, or Firm* — Bond, Schoeneck & King, PLLC; Frederick Price

(57) ABSTRACT

An electrical wiring device including a housing assembly including a plurality of terminals at least partially disposed therein, the plurality of terminals including a HOT/LOAD terminal, a NEUTRAL terminal, a first traveler terminal, and a second traveler terminal, wherein, when in use, at least one of the terminals is connected to line hot; a first series FET and a second series FET disposed in series between the HOT/LOAD terminal and one of the first traveler terminal or the second traveler terminal; at least one of a first sensor producing a first sensor output according to current flow or a voltage at the one of the first traveler terminal or the second traveler terminal and a second sensor producing a second sensor output according to current flow through the NEUTRAL terminal or according to a voltage between the first series FET and second series FET; and a controller configured to determine to which of the plurality of terminals line hot is connected based, at least, on the first sensor output or the second sensor output and to provide, during operation, at least one of a first control signal to the first series FET and a second control signal to the second series FET according to a user adjustable load setting.

30 Claims, 20 Drawing Sheets

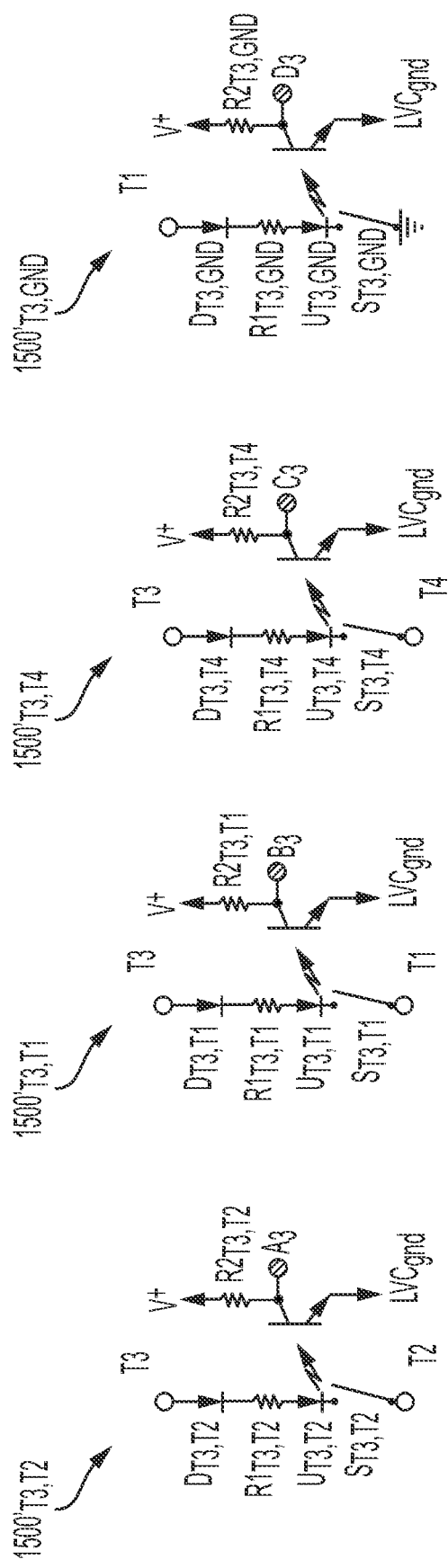
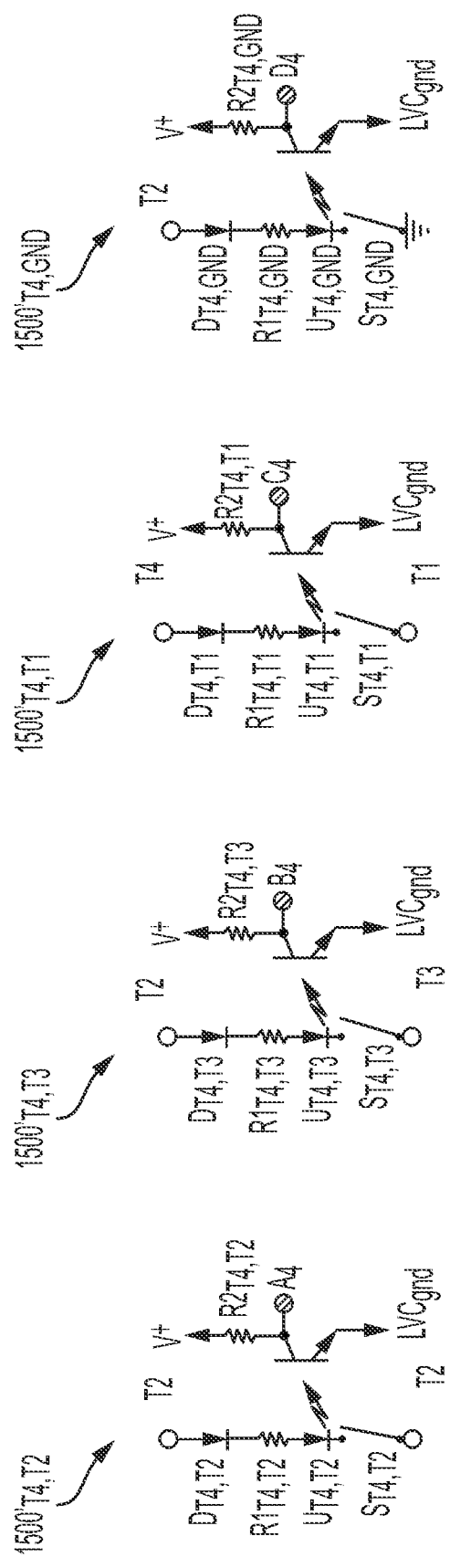
FIG. 17C
FIG. 17D

ELECTRICAL WIRING DEVICE WITH WIRING DETECTION AND CORRECTION

CROSS-REFERENCE TO RELATED APPLICATION

The present application claims priority to and the benefit of U.S. Provisional Patent Application No. 62/840,111, filed on Apr. 29, 2019 and of U.S. Provisional Patent Application No. 62/840,043, filed on Apr. 29, 2019, each of which is hereby incorporated by reference herein in its respective entirety.

BACKGROUND OF THE INVENTION

1. Field of the Invention

The present invention relates generally to electrical wiring devices (e.g., electromechanical switch, dimmer, and outlet device) assemblies, and more particularly to electrical wiring devices that detect a wiring configuration (e.g., to which terminal line hot and line neutral are connected and/or to which terminal a load is connected) and to electrical wiring devices that reconfigure the terminal connections automatically upon determining an incorrect wiring configuration.

2. Description of the Related Art

Do-it-yourself homeowners are performing more and more repair and installations themselves. Without the proper training, homeowners tend to make mistakes, which lead to customer dissatisfaction and, ultimately, product returns. Indeed, out of 32 possible installation possibilities for a three-wire dimmer, only four are correct and will produce the expected dimmer behavior. Table 1 lists all possible ways a 3-wire dimmer could be wired—of which wirings 1, 7, 13, and 18 are correct.

TABLE 1

List of Possible Three-Wire Dimmer Wiring Configurations

| Wiring Config | Dimmer Terminals | | | | Conclusion |
|---|---|---|---|---|---|
| | Hot/Load | 1P | 3W | Neutral | |
| 1 | Hot | 1 P Load | | Neutral | Correct wiring for source side, single pole installation |
| 2 | Hot | 1 P Load | Neutral | | |
| 3 | Hot | Neutral | 1 P Load | | |
| 4 | Hot | Neutral | | 1 P Load | |
| 5 | Hot | | 1 P Load | Neutral | |
| 6 | Hot | | Neutral | 1 P Load | |
| 7 | 1 P Load | Hot | | Neutral | Correct wiring for load side, single pole installation |
| 8 | 1 P Load | Hot | Neutral | | |
| 9 | 1 P Load | Neutral | Hot | | |
| 10 | 1 P Load | Neutral | | Hot | |
| 11 | 1 P Load | | Neutral | Hot | |
| 12 | 1 P Load | | Hot | Neutral | |
| 13 | Hot | 1 P Load | 3 W Load | Neutral | Correct wiring for source side, three-way installation |
| 14 | Hot | 3 W Load | 1 P Load | Neutral | |
| 15 | Hot | 1 P Load | Neutral | 3 W Load | |
| 16 | Hot | Neutral | 1 P Load | 3 W load | |
| 17 | Hot | Neutral | 3 W Load | 1 P Load | |
| 18 | Load | 1 P Src | 3 W Src | Neutral | Correct wiring for load side, three-way installation |
| 19 | Load | 3 W Src | 1 P Src | Neutral | |
| 20 | Load | 1 P Src | Neutral | 3 W Src | |
| 21 | Load | Neutral | 1 P Src | 3 W Src | |
| 22 | Load | Neutral | 3 W Src | 1 P Src | |
| 23 | Neutral | 1 P Load | 3 W Load | Hot | |
| 24 | Neutral | 1 P Load | Hot | 3 W Load | |
| 25 | Neutral | Hot | 3 W Load | 1 P Load | |
| 26 | Neutral | Hot | 1 P Load | 3 W Load | |
| 27 | Neutral | 3 W Load | 1 P Load | Hot | |
| 28 | Neutral | 1 P Src | 3 W Src | Load | |
| 29 | Neutral | 1 P Src | Hot | 3 W Src | |
| 30 | Neutral | Hot | 3 W Src | 1 P Src | |
| 31 | Neutral | Hot | 1 P Src | 3 W Src | |
| 32 | Neutral | 3 W Src | 1 P Src | Hot | |

Table 1 wiring configurations 1 through 6 describe a typical single pole installation. Configuration 1 is the most correct installation. Configuration 5 will also function without harming the dimmer or the load, however, the ON/OFF function will likely be upside down. Configurations 2, 3, 4, and 6 will result in dimmer and/or load failures when the dimmer is exercised.

Accordingly, there is a need in the art for detecting the wiring configuration of a dimmer. Once the configuration of a dimmer is detected, a user can be notified of the configuration (and/or of the need to correct the wiring configuration). Alternatively, some corrective action can be taken by the dimmer to correct the wiring configuration internally (e.g., reroute the terminals to the correct locations).

In addition, most residential dimmers, such as shown in the schematic of FIGS. 1A-B (and FIG. 12), use "forward phase control" (FPC) to set the dimming level. Forward phase control "chops" the initial part of each half cycle, so that no voltage is applied to the load during the first part of each half cycle. The level of dimming thus depends on the amount of the half-cycle that is "chopped." Typically, when performing FPC while using two FETs to control the chopping, both FETs are controlled in tandem.

Alternatively, a reverse phase control (RPC) can be implemented by the dimmer, in which the second part of each half cycle is chopped. While RPC works well for resistive and capacitive loads, it generates an inductive "kickback" when applied to inductive loads. The inductive kickback occurs when current flowing through an inductor is turned off (via an inline/series switch). When this happens, the inductor is discharged, generating current flowing in the direction current was flowing before being switched off. For this reason, RPC cannot be used with an inductive load because the switch off event happens midway in the cycle, where voltages are highest.

An example of the kickback produced by FPC can be observed as the circled current spikes in FIG. 2. Inductive kickback can stress the FETs or other components used in the dimmer and can cause excessive heating in the components connected to the AC supply.

The inductive kickback can, however, be dissipated—and the resultant stress and excessive heat avoided—with a firing sequence (alternately referred to as a control sequence) that shunts the spike back to the AC supply. An example timing diagram of such a firing sequence is shown in FIG. 3. The bottom two rows depict, to the left, where HOT and LOAD are connected. Here, HOT is connected to the drain of Q3 and LOAD is connected to the drain of Q4. To the right of the HOT and LOAD indicators, the gate voltage over time for both Q3 and Q4 is depicted. In both FIG. 3, and in the remaining plots and timing diagrams including with this application, Q3 and Q4 are ON when the voltage at the gate is LOW (in an alternative example, Q3 and Q4 can be ON when the voltage at the gate is HIGH). In FIG. 3, current flows (represented as shading) when both Q3 and Q4 are ON.

In this plot, the passage of time is denoted by the zero cross events of the LINE voltage. The zero-cross events are represented by tick marks in the top two rows. The second row, labeled ZC event (falling edge) is measured with a zero-cross detection circuit and represents the falling edge zero events. Any suitable zero cross detection circuit can be used. The top row labeled timed ZC event is estimated with a timer that marks the rising edge zero cross according to the time elapsed since the most recent falling edge zero cross event. It should, however, be understood that any suitable method of detecting or estimating the zero cross events, whether falling edge or rising edge, can be used.

The kickback is shunted when one of the FETs remains ON during the transition to the next and opposite polarity half cycle. During the first illustrated positive half cycle, Q3 is OFF (chopped) for the first half of the positive cycle, and Q4 is ON. For the second half of the same positive half cycle, Q3 is turned ON, and Q4 remains ON. Going into the negative half cycle, Q3 remains ON, and Q4 is switched OFF (chopped). At this point, Q3 remains ON as the AC line transitions to the negative half cycle, since the current flowing through the inductive load continues flowing when Q3 would otherwise have turned OFF at zero cross (behavior comparable to the operation of a triac). But since Q3 remains ON, the kickback is absorbed. In the second half of the same negative half cycle, Q3 remains ON, and Q4 is switch ON, etc. It should also be noted that Q3 and Q4 have body diodes and will thus be "ON," conducting via the body diode in response to certain voltages (i.e., a higher voltage present at anode of D9 than cathode), rather than due to switching the actual FET ON.

This type of switching technique is referred to as Magnetic Low Voltage (MLV) mode. As a result of the MLV mode, the kickback is eliminated. The eliminated kickback can be observed by comparing FIG. 4 (which uses MLV mode) to FIG. 2. As shown, the current spikes of FIG. 2 are not present in FIG. 4. MLV loads typically have special supplies that act as an interface between the dimmer and the actual magnetic load. However, inductive characteristics can be present in house wiring and some loads (not necessarily MLV). Even the slightest inductive characteristics can result in kickback if not dealt with properly via switching technique.

While this firing sequence eliminates the inductive kickback problem, it requires the dimmer to be connected to the load in a particular way in order to function properly. More specifically, a dimmer implementing the MLV firing sequence must have its HOT terminal (i.e., the terminal intended to be connected to HOT) connected to HOT of the AC supply. Such a connection is shown, for example, in FIG. 5. If, however, the dimmer HOT terminal is connected to the load, as is shown in FIG. 6, the MLV firing sequence will result in no dimming—that is, there will be no modulation, and current will be supplied to the load through the entire cycle, as is shown in FIG. 7.

Accordingly, there exists a need in the art for a system and method for detecting whether HOT is connected to the designated HOT terminal of a dimmer implementing a firing sequence designed to mitigate the effects of inductive kickback. Furthermore, there exists a need in the art for determining the wiring configuration of an electrical wiring device in general. There also exists a need in the art for correcting an incorrect wiring configuration or taking other measures when an incorrect wiring configuration is detected.

BRIEF SUMMARY OF THE INVENTION

It is therefore a principal object and advantage of the present invention to provide an electrical wiring device assembly that eliminates one or more of the problems/issues discussed above. In particular, the present disclosure is directed to inventive devices and systems structured and/or configured to determine a wiring configuration of an electrical wiring device and to correct the wiring configuration or to take other measures when an incorrect wiring configuration is detected.

A particular non-limiting goal of the utilization of the embodiments and implementations herein is to provide an electrical wiring device including a housing assembly including a plurality of terminals at least partially disposed therein, the plurality of terminals including a HOT/LOAD terminal, a NEUTRAL terminal, a first traveler terminal, and a second traveler terminal, wherein, when in use, at least one of the terminals is connected to line hot; at least one variable control mechanism coupled to the housing assembly, the at least one variable control mechanism being configured to adjustably select a user adjustable load setting, the user adjustable load setting being adjustable between a minimum setting and a maximum setting; a first series FET and a second series FET disposed in series between the HOT/LOAD terminal and one of the first traveler terminal or the second traveler terminal; at least one of a first sensor producing a first sensor output according to current flow or a voltage at the one of the first traveler terminal or the second traveler terminal and a second sensor producing a second sensor output according to current flow through the NEUTRAL terminal or according to a voltage between the first series FET and second series FET; and a controller configured to determine to which of the plurality of terminals line hot is connected based, at least, on the first sensor output or the second sensor output and to provide, during operation, at least one of a first control signal to the first series FET and a second control signal to the second series FET according to the user adjustable load setting Another goal is to provide an electrical wiring device, including: a housing assembly including a plurality of terminals at least partially disposed therein, the plurality of terminals including a first terminal, a second terminal, a third terminal, and a fourth terminal, wherein, when in use, one of the plurality of terminals is connected to line hot and one of the plurality of terminals is connected to line neutral; a first plurality of wiring identification circuits each comprising an input side and output side, the input side being isolated from the output side, wherein the input side is electrically connected between a respective pair of the plurality of terminals and the output side produces an output if a voltage exists between the respective pair of the plurality of terminals, the outputs of the first plurality of wiring identification circuits forming a first plurality of outputs; and a control circuit receiving the output from each wiring identification circuit of the first plurality of wiring identification circuits and configured to determine, during use, to which of the plurality of terminals line hot and line neutral are connected according to first plurality of outputs.

An electrical wiring device comprising: a housing assembly including a plurality of terminals at least partially disposed therein, the plurality of terminals including a HOT/LOAD terminal, a NEUTRAL terminal, a first traveler terminal, and a second traveler terminal, wherein, when in use, at least one of the terminals is connected to line hot; at least one variable control mechanism coupled to the housing assembly, the at least one variable control mechanism being configured to adjustably select a user adjustable load setting, the user adjustable load setting being adjustable between a minimum setting and a maximum setting; a first series FET and a second series FET disposed in series between the HOT/LOAD terminal and one of the first traveler terminal or the second traveler terminal; at least one of a first sensor producing a first sensor output according to current flow or a voltage at the one of the first traveler terminal or the second traveler terminal and a second sensor producing a second sensor output according to current flow through the NEUTRAL terminal or according to a voltage between the first series FET and second series FET; and a controller configured to determine to which of the plurality of terminals line hot is connected and to provide, during operation, at least one of a first control signal to the first series FET and a second control signal to the second series FET according to the user adjustable load setting, wherein the first control signal and the second control signal are provided to the first series FET and the second series FET in accordance with a first dimming sequence or a second dimming sequence, based on, at least, to which of the plurality of terminals line is connected.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which:

FIGS. 1A-B together are a dimmer circuit including a plurality of sensors to detect a wiring configuration, according to an example.

FIG. 17C is a schematic of a set of wiring identification sub-circuits, according to an example.

FIG. 17D is a schematic of a set of wiring identification sub-circuits, according to an example.

DETAILED DESCRIPTION OF THE INVENTION

Figure 1A:
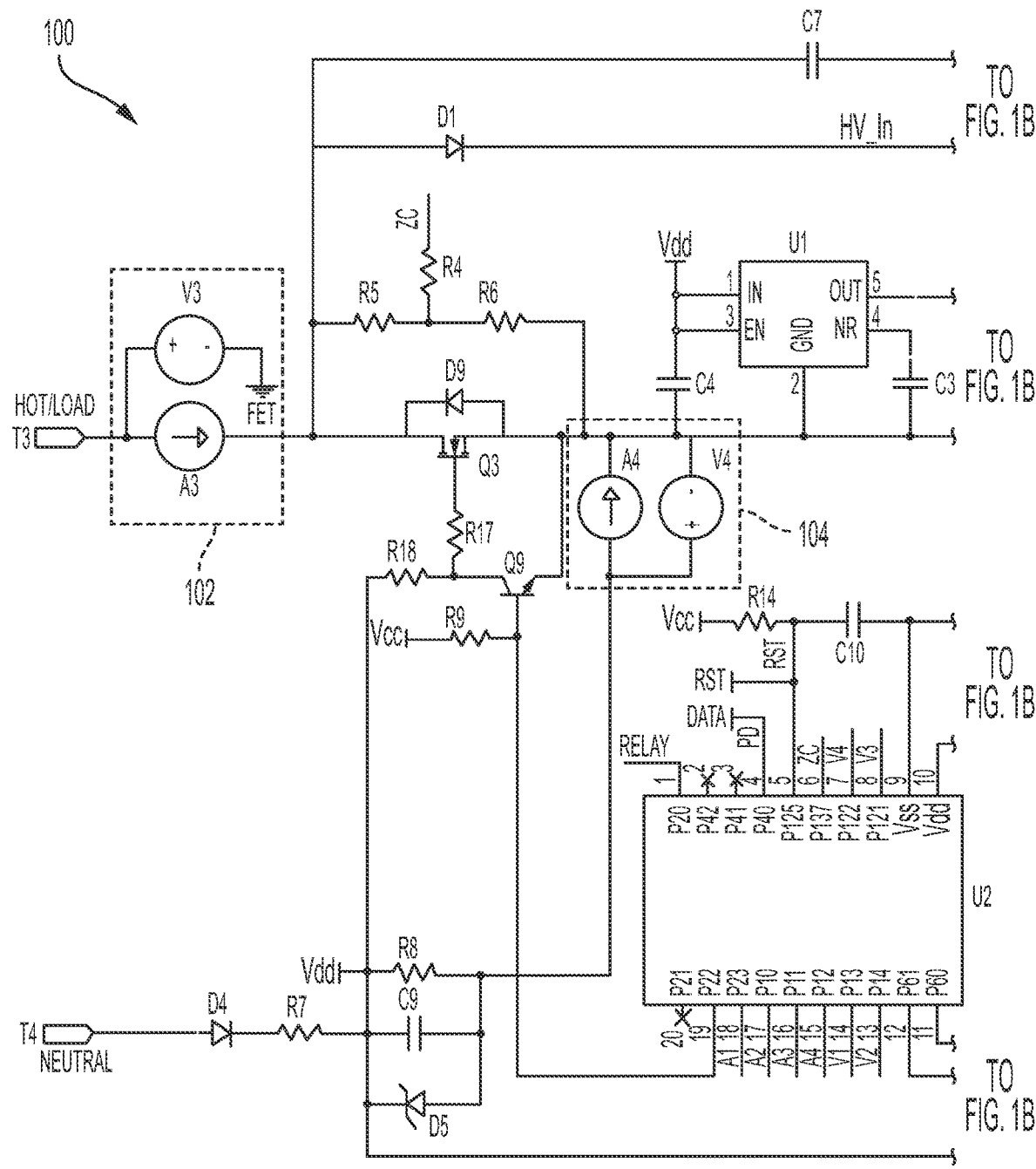

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Each non-photographic figure provided and referenced herein includes line drawings, which are numbered, and exact copy color drawings (on the same page) for clarity.

Various examples described herein are directed toward a dimmer or other electrical wiring device being configured to detect a wiring configuration and/or to correct the wiring configuration once detected.

In an example, to determine the wiring configuration of a dimmer, current sensors or voltage sensors can be operably positioned at each of the dimmer terminals or at a subset of the dimmer terminals. When the dimmer is wired and power is applied, current will flow through certain terminals or paths within the dimmer circuit, either as a result of the body diode of the FETs or by turning one or more of the FETs ON. By measuring the presence or direction of current or the presence or polarity of the voltage at each of the terminals, or at a subset of the terminals, the wiring configuration of the dimmer can be determined.

Turning again to FIGS. 1A-B, there is shown an example dimmer 100 schematic representing a dimmer that can be used in conjunction with the various examples described herein. It should be understood that dimmer 100 represents only one example of such a dimmer and that, in alternative examples, the dimmer can take any number of forms. Indeed, the ideas described herein can be implemented with any dimmer that has multiple terminals subject to miswiring and that includes at a first series FET and a second series FET disposed between the HOT/LOAD terminal and the switch-pole terminal (e.g., terminals 1 pole and 3-way) and controlled by a PWM signal from a controller.

The operation of dimmer 100 will be generally understood; however, a brief explanation will be provided for the sake of completeness. The controller U2 controls the dimmer 100 by way of the pulse width modulation (PWM) signal. The PWM signal propagates at logic levels (+5V, GND) and controls the operation of transistors Q3 and Q4. The width of the PWM pulse is varied to control the amount of power provided to the load, whether a lamp load or a motor load. The PWM signal comprises at least one pulse in an AC line cycle. In one embodiment of the invention, the PWM signal may provide a plurality of pulses within an AC half cycle. By using pulse width modulation, dimmer 100 can be used as universal dimmer device that can control any type of lighting load by varying the duty cycle of the pulse. In operation, when the PWM signal is high, the transistors Q9 and Q12 conduct to turn transistors Q3 and Q4 ON in accordance with the appropriate timing. Note that two transistors (Q3, Q4) are required for operation. This is due to the internal body diode inherent in MOSFET technology; one MOSFET blocks a portion of the positive AC half cycle, and the other blocks a portion of the negative half-cycle to the load. The timing of the PWM pulse is of course controlled by controller U2 and it is timed relative to the zero crossing of the AC cycle. As noted above, dimming is accomplished in the forward phase by switching the load current ON sometime after the zero-crossing of the AC half-cycle and turned OFF at the next zero-crossing of the AC waveform. Conversely, in reverse phase control, the load current is turned ON when the zero-crossing is detected and turned OFF sometime before the next zero-crossing is detected.

Because the PWM pulse is controlled by the controller U2 with such a high degree of granularity while simultaneously monitoring the load current, the dimmer circuit may be employed in forward phase for certain optimized ELV, CFL and LED devices. The controller U2 transmits the PWM signal at a very low duty cycle until the I SNS AMP OUT signal (from the load current detector 112) indicates that there is a load current being drawn. If the fixture is an incandescent one, the load current in this region is substantially linear with respect to the PWM duty cycle. If the fixture is an LED fixture, the load current will not be present until the duty cycle has been increased to a certain threshold. Stated differently, the present invention employs a control loop that optimizes the PWM duty cycle for any given lighting load. Moreover, the controller U2 can adjust the PWM signal to operate in forward phase or reverse phase by operation of the software. Again, as those skilled in the art will appreciate, forward phase control is appropriate for conventional incandescent lighting, magnetic low voltage (MLV) lighting fixtures, conventional fluorescent lighting fixtures employing electronic ballasts (EFL), and halogen lighting. Reverse phase control is generally appropriate for electronic low voltage (ELV) lighting. Bulbs designed as higher efficiency 120V incandescent replacements, including LED bulbs and compact florescent lights (CFL) typically perform better with forward phase control. The principle of operation of dimmer 100 is further described in U.S. Pat. No. 9,130,373 and titled "Universal Power Control Device" the entirety of which is incorporated herein by reference. In addition, the dimmers described in the following patents: U.S. Pat. No. 10,476,368 titled "Power control device", U.S. Pat. No. 9,996,096 titled "Power control device with calibration features", and U.S. Pat. No. 9,184,590 titled "Universal power control device" can be used in conjunction with the sensing, wiring configuration determination, and correction, and other features that can be combined in any technically possible way, described in this disclosure (as will be understood by a person of ordinary skill in the in art in conjunction with a review of this disclosure) and are incorporated by reference in their entirety.

Figure 1B:
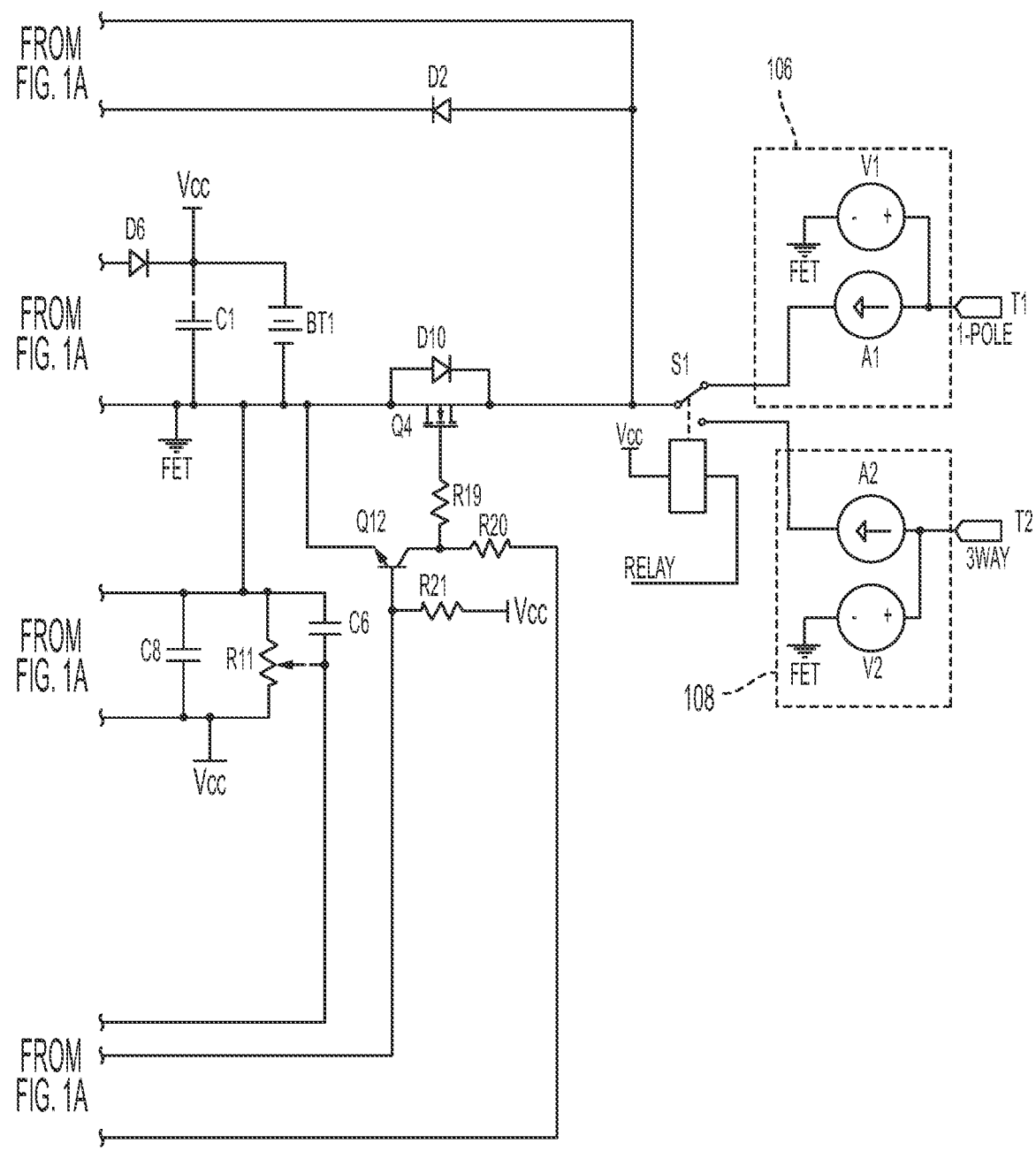
Figure 2:
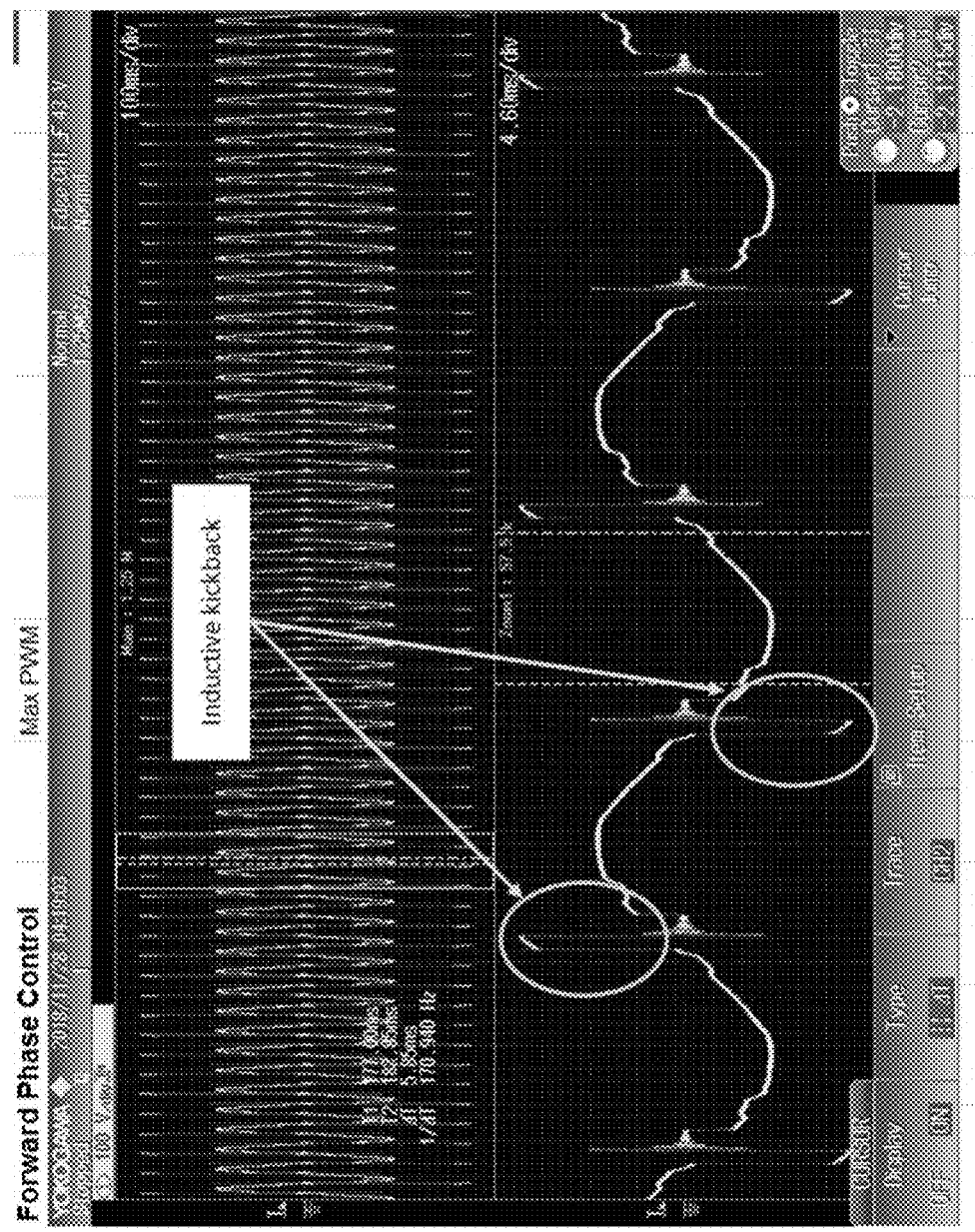
FIG. 2 is a plot showing a dimmer output signal including inductive kickback resulting from forward phase control, according to an example.

As shown in FIGS. 1A-B, dimmer 100 further includes a plurality of sensors 102, 104, 106, and 108. The controller U2, shown here as a microcontroller, is configured to receive signals from one or more of the plurality of sensors in order to determine the wiring connection or, in another example, to which set of terminals HOT is connected. Controller U2 can comprise a processor and a non-transitory storage medium configured to store program code for the implementation of the various methods described in this disclosure, including firing FETs Q3 and Q4 according to the methods described herein. Controller U2 can further be connected, wirelessly, to a mobile device, local server, or remote server, and can report any detected wiring configurations, or can simply report the need to rewire the device, to the connected device or server.

To manage controller's ability to operate independent of the devices wiring, the dimmer can contain a wiring-independent power source. For example, in FIGS. 1A-B a battery BT1 is connected to the Vcc node. Alternately, this also could be a small solar element or any other power source which is sufficient to activate U2 to measure and report the conclusions.

The sensors 102, 104, 106, and 108 can be current sensors, shown in FIGS. 1A-B as A1, A2, A3, and A4, or voltage sensors, shown as V1, V2, V3, and V4. The current sensors can be comprised of any suitable current sensor, such as magnetic, passive, or Hall Effect sensors. Likewise, the voltage sensors can be comprised of any suitable voltage sensor, such as magnetic, integrated circuits or passive sensors. These sensors could use magnetic, integrated circuits or passives to accomplish this measurement. Those skilled in the art must weigh the cost, complexity and performance to choose the best current and voltage measurement option for any specific design. (Similarly, sensors 1202 and 1204 of FIG. 12 can be any of the sensors described above.)

As shown in the example of FIGS. 1A-B, each sensor 102, 104, 106, 108 can be operably positioned with an associated dimmer terminal, such that the current or voltage associated with that terminal (or a current or voltage representative of the current or voltage at that terminal) can be measured. The sensors can be positioned, for example, as follows: at the HOT/LOAD terminal (sensor 102), between Neutral and common terminal of MOSFETs (sensor 104), at the 1-Pole terminal (sensor 106), and at the 3-way terminal (sensor 108).

While both a voltage sensor and a current sensor is shown in FIGS. 1A-B, in connection with each sensor 102, 104, 106, 108, it should be understood that only one of a voltage sensor or a current sensor may be employed—it is generally not necessary to use both. Furthermore, it should be understood that each current sensor will typically be placed in series with an associated terminal. However, the current sensor can be generally placed in a location in which the current from the terminal can be derived. Thus, the current sensor can be placed, for example, in any location in series with the terminal in which the current at the terminal, or a current representative (e.g., proportional) to the current at the terminal, can be measured. Similarly, the voltage sensor can be placed in connection with the terminal such that the voltage at the terminal or a voltage proportional to the voltage at the terminal can be measured. Indeed, the current or voltage sensors can be placed in any location in which the current or voltage attributable to a particular terminal can be measured and determined.

In an example, at startup or during a configuration phase, the current or voltage at each terminal can be measured according to a three-step process. At step 1, the current or voltage of every sensor, with S1 in a known position (either 1-pole or 3-way), is measured without turning either FET ON. Current will flow through the body diodes of the FETs Q3 and Q4 in certain wiring configurations. Thus, depending on whether current is measured, and through which the sensors current flows, the location of hot and neutral can be determined. Step 1 is, however, not sufficient, alone, to determine precisely how the dimmer is wired.

At step 2, the current or voltage of every sensor is measured while turning the FETs Q3 and Q4 ON for a short duration (e.g., near zero cross). (In an example, the FETs Q3 and Q4 are turned ON for less than 10% of the 8.33 ms half-cycle, although other lengths are contemplated.) The respective locations of HOT and load will result in a measurement of load current at one or more sensors. Thus, depending on which sensors measure current, and the magnitude of the current measured, the wiring configuration can be further narrowed.

The order of steps 1 and 2 is not fixed and, in different examples, the order can be reversed. Furthermore, in alternate embodiments, only one of steps 1 or 2 can be performed. For example, if the only purpose is to detect the locations of HOT and NEUTRAL, then only step 1 can be performed, and step 2 can be excluded.

At step 3, the switch S1 is switched to the opposite position and steps 1 and 2 are repeated. According to the current measured during the above steps, the wiring configuration can be determined.

The particular wiring configuration can be determined by comparing the measured currents to a look-up table stored in memory of controller U2. The look-up table can be generated by predicting the current or voltage in the given configuration and the given step. For example, during the negative half-cycle, wiring configuration 1 will result in −5 mA current flowing through A3 and 5 mA of current flowing through A4 as a result of body diode of Q3. (This assumes that the power supply is configured to 5 mA of current when an otherwise unimpeded and connected to dimmer.) This step will rule out certain wiring configurations, such as wiring configuration 2, in which no current will be observed during step 1. However, step 1 is not sufficient, in and of itself, to distinguish wiring configuration 1 from other wiring configurations, such as wiring configurations 4, 5, or 6, which similarly see −5 mA of current at A3 and 5 mA of current at A4, during step 1.

At step 2, Q3 and Q4 FETs are pulsed during the positive-half cycle for a duration long enough to measure current at the sensors, and, preferably, near the zero-cross. Wiring configuration 1 will result load current being measured at HOT current sensor A3 and 1-Pole current sensor A1.

At step 3, the switch S1 is switched to the 3-way position, and steps 1 and 2 are repeated. Wiring configuration 1 will result, again in −5 mA at A3 and 5 mA at A4, but no current will flow during the positive half-cycle at step 2 because the load is not connected. In this way, for each wiring configuration, the look-up table can be built out, and, by completing steps 1-3, the particular wiring configuration can be determined.

An example lookup table of wiring configurations 1-6 (as laid out in Table 1) is shown below. A person of ordinary skill, in conjunction with a review of this disclosure, will understand how to generate the remaining values. The table uses VIN/RL as an approximation of load current. Furthermore, although only current values are shown, a person of ordinary skill in the art, in conjunction with a review of this disclosure, would understand how to substitute values of voltage.

TABLE 2

| Wiring Config | S1 Pos | Step | 1-POLE A1 | 3WAY A2 | HOT/LD A3 | NEU A4 |
|---|---|---|---|---|---|---|
| 1 | 1-Pole | 1 | 0 | 0 | −5 mA | 5 mA |
|  |  | 2 | −$V_{IN}/R_L$ | 0 | $V_{IN}/R_L$ | 0 |
|  | 3-Way | 1 | 0 | 0 | −5 mA | 5 mA |
|  |  | 2 | 0 | 0 | 0 | 0 |
| 2 | 1-Pole | 1 | 0 | 0 | 0 | 0 |
|  |  | 2 | N/A | N/A | N/A | N/A |
|  | 3-Way | 1 | 0 | 0 | 0 | 0 |
|  |  | 2 | N/A | N/A | N/A | N/A |
| 3 | 1-Pole | 1 | 0 | 0 | 0 | 0 |
|  |  | 2 | N/A | N/A | N/A | N/A |
|  | 3-Way | 1 | 0 | 0 | 0 | 0 |
|  |  | 2 | N/A | N/A | N/A | N/A |
| 4 | 1-Pole | 1 | 0 | 0 | −5 mA | 5 mA |
|  |  | 2 | −$I_{sc}$ | 0 | +$I_{sc}$ | 0 |
|  | 3-Way | 1 | 0 | 0 | −5 mA | 5 mA |
|  |  | 2 | 0 | 0 | 0 | 0 |

TABLE 2-continued

| Wiring Config | S1 Pos | Step | 1-POLE A1 | 3WAY A2 | HOT/LD A3 | NEU A4 |
|---|---|---|---|---|---|---|
| 5 | 1-Pole | 1 | 0 | 0 | −5 mA | 5 mA |
|   |        | 2 | 0 | 0 | 0 | 0 |
|   | 3-Way  | 1 | 0 | 0 | −5 mA | 5 mA |
|   |        | 2 | 0 | $-V_{IN}/R_L$ | $V_{IN}/R_L$ | 0 |
| 6 | 1-Pole | 1 | 0 | 0 | −5 mA | 5 mA |
|   |        | 2 | 0 | 0 | 0 | 0 |
|   | 3-Way  | 1 | 0 | 0 | −5 mA | 5 mA |
|   |        | 2 | 0 | $-I_{sc}$ | $+I_{sc}$ | 0 |

It is not, however, always necessary to determine the exact wiring configuration; rather, in some cases, it may only be necessary to determine where HOT is connected. In this instance, two sensors can be used. For example a sensor can be placed in series with the FETs (series sensor) and another sensor placed between the common FET source and neutral (neutral sensor). The series sensor can be placed to determine the current through the traveler terminals 1-POLE and 3-WAY. This can accomplished by placing a sensor, such as sensor 1202, in series with both traveler terminals. In an alternative example, as shown in FIGS. 1A-B, sensors 106, 108 can together be used as the series sensor, since one will be in the correct configuration depending on the position of switch S1. The series sensor can be a current sensor (e.g., A1 and A2) to determine the current through the traveler terminals or a voltage sensor (e.g., V1 and V2) to determine the voltage at the traveler terminals. Similarly, the neutral sensor can be a current sensor (e.g., A4) to determine the current flowing between neutral and the common FET source or a voltage sensor (e.g., V4) to determine the voltage between the common FET source.

In either case, if HOT is connected at the 1 Pole terminal or 3-Way terminal, current will flow through the body diode of Q4 during the negative half cycle and will be measured at both current sensors (or both voltage sensors). (This will depend in part on the orientation of switch S1). If HOT is connected at the HOT/LOAD terminal, current will flow through the body of diode of Q3 during the negative half cycle. Thus, if current or a voltage is detected at only the neutral sensor, HOT is connected at the HOT/LOAD terminal. If current or a voltage is detected at both the neutral sensor and series sensor, then HOT is connected to one of 1 Pole terminal or 3-Way terminal.

Alternatively, to detect the location of HOT, only one of the series sensor (e.g., sensor 1202 or sensor 106 and 108) or neutral sensor (e.g., sensor 1204 or sensor 104) be used in conjunction with a particular firing sequence, as will be described below in connection with FIGS. 8-11. To the extent that the description below in FIGS. 8-11 describes measuring current flow, it should be understood that this can be accomplished by measuring the voltage at at least one of the traveler terminals (e.g., with sensors V1, V2, or with sensor 1202) or at the voltage between the common FET source and NEUTRAL (e.g., with sensors V4 or 1204). Note that load or HOT connection can be implemented either with a manual switch or a relay under control of a controller (such as controller U2). Using a manual switch, the user will be alerted to a wait state until the load is connected or in the case of a controller, the device will test and confirm a load is present before proceeding with the Hot detection as indicated with S1 in FIGS. 1A-B or S2 in FIG. 12.

Figure 5:
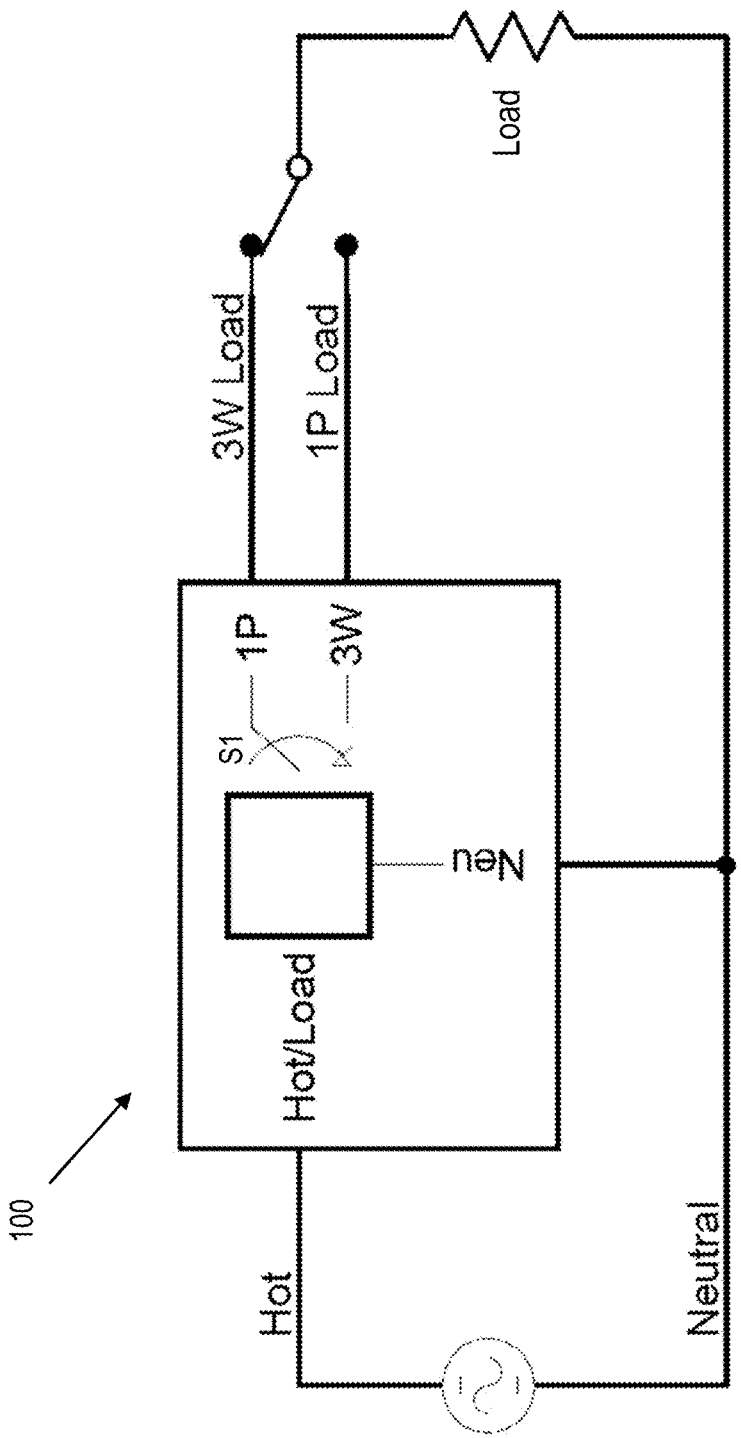
FIG. 5 is a wiring diagram of a dimmer depicting hot connected to the HOT/LOAD terminal and the load attached to one of the traveler terminals, according to an example.
Figure 8:
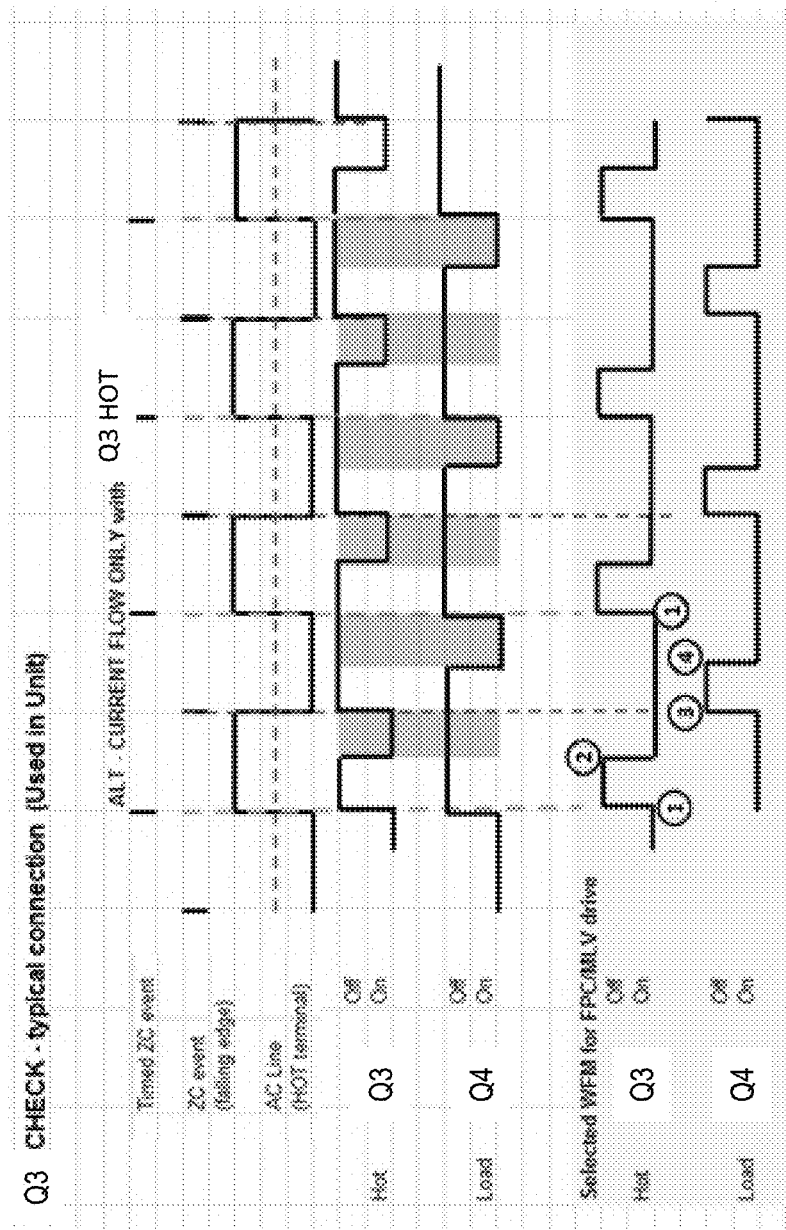
FIG. 8 is a timing diagram depicting a first control sequence with line hot connected to the HOT/LOAD terminal and load connected to one of the traveler terminals, according to an example.
Figure 9:
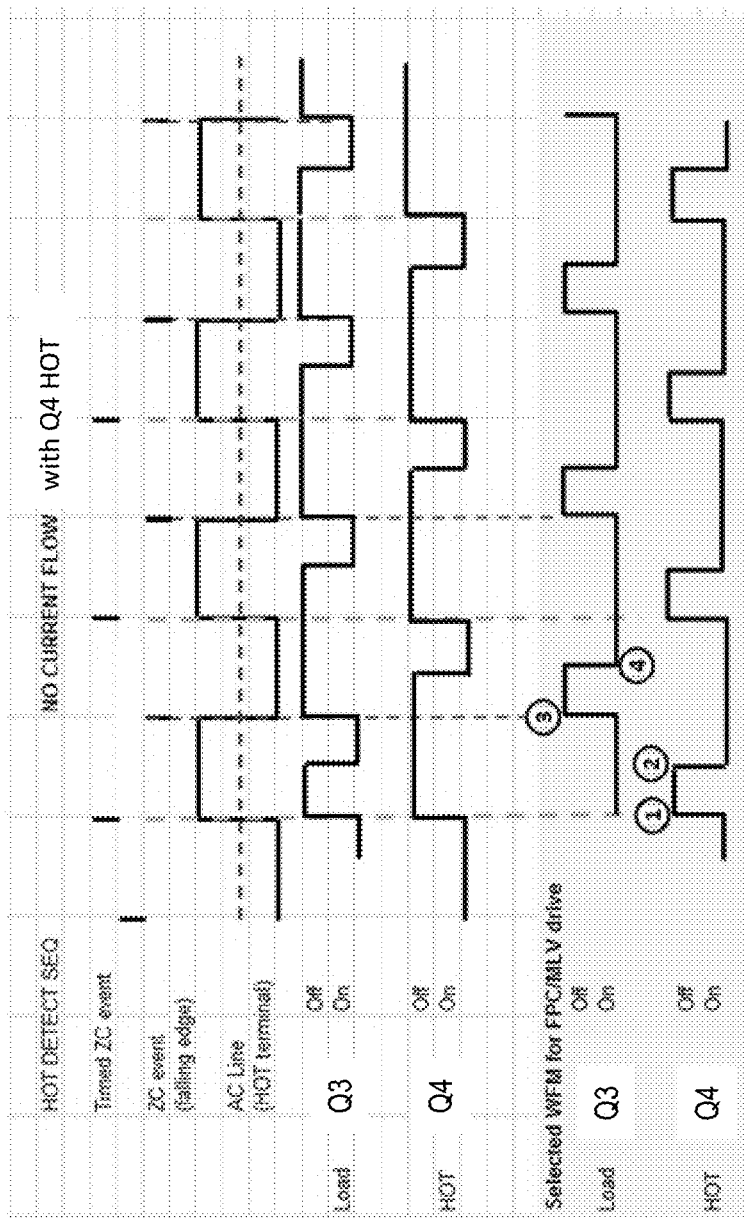
FIG. 9 is a timing diagram depicting a first control sequence with line hot connected to one of the traveler terminals and load connected to the HOT/LOAD terminal, according to an example.

FIGS. 8 and 9 depict a first firing sequence for determining whether the HOT terminal is connected to Q3 (as shown, e.g., in FIG. 5). In the example of FIG. 8, line hot is connected to Q3 (i.e., to the HOT/LOAD terminal) and the load is connected to Q4 (i.e., to one of the traveler terminals), which is the configuration for which dimmer of FIGS. 1A-B is normally designed. As shown, during the positive half-cycle of the AC line, Q3 and Q4 are first both OFF. During the second half of the first positive half-cycle, Q3 is turned ON while Q4 is left OFF, which results in current flow because of the polarity of the Q4 body diode and the connection of HOT to Q3. During the first half of the negative half-cycle, both Q3 and Q4 are again OFF, so no current flows. During the second half of the negative half-cycle, Q4 is turned ON and Q3 is left OFF. Again, current will flow because the polarity of AC wave and the polarity of the body diode of Q3.

If there is no current flow—as shown, for example, in FIG. 9—it can be determined that (1) HOT is either not connected to Q3, or (2) there is no load connected to the dimmer. (FIG. 9 specifically depicts a case in which the firing sequence of FIG. 8 is implemented while HOT is connected to Q4. However, the same lack of current will result from no load connected to the dimmer, so the result of the test of FIG. 9 is ambiguous on its own.)

Figure 10:
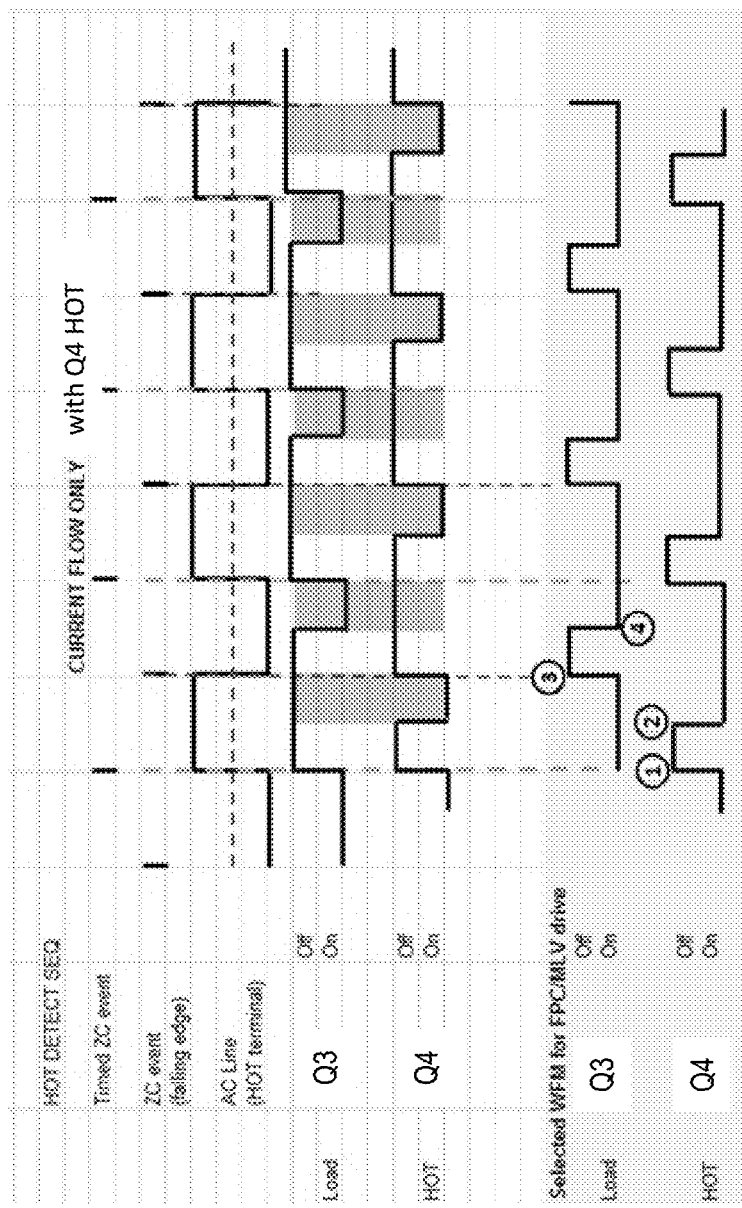
FIG. 10 is a timing diagram depicting a second control sequence with line hot connected to one of the traveler terminals and load connected to the HOT/LOAD terminal, according to an example.
Figure 11:
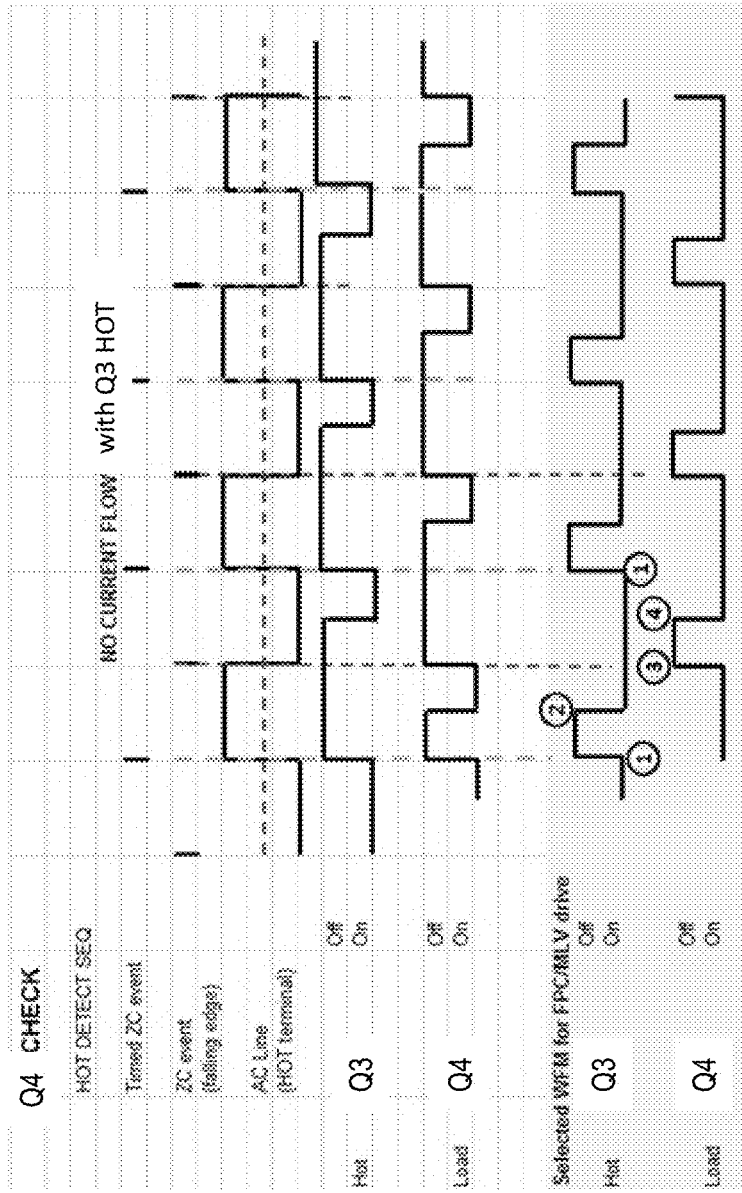
FIG. 11 is a timing diagram depicting a second control sequence with line hot connected to the HOT/LOAD terminal and load connected to one of the traveler terminals, according to an example.

Apart from a separate method of determining the presence of a load (which would rule out the possibility that no load is connected to the dimmer), it is thus necessary to run a sequence for positively determining if line HOT is connected to Q4, that is, to the load terminal of the dimmer. Such a firing sequence, referred to in this disclosure as the "second firing sequence," is depicted in FIGS. 10 and 11. This sequence is, in some respects, the mirror image of the firing sequence depicted in FIGS. 8 and 9. Turning first to FIG. 10, in which the load is connected to Q3 (as it is in FIG. 9), Q3 and Q4 are both OFF during the first half of the positive half-cycle, which prevents the flow of any current. During the second half of the positive half-cycle, Q4 is turned ON while Q3 is held OFF. Because of the polarity of the AC line and the body diode of Q3, current flows. During the first half of the negative half-cycle, both Q3 and Q4 are again OFF so that no current flows. During the second half of the negative half cycle, Q3 is turned ON while Q4 is held OFF. Again, current will flow, this time due to the polarity of the Q4 body diode with respect to the polarity of the AC line.

Figure 6:
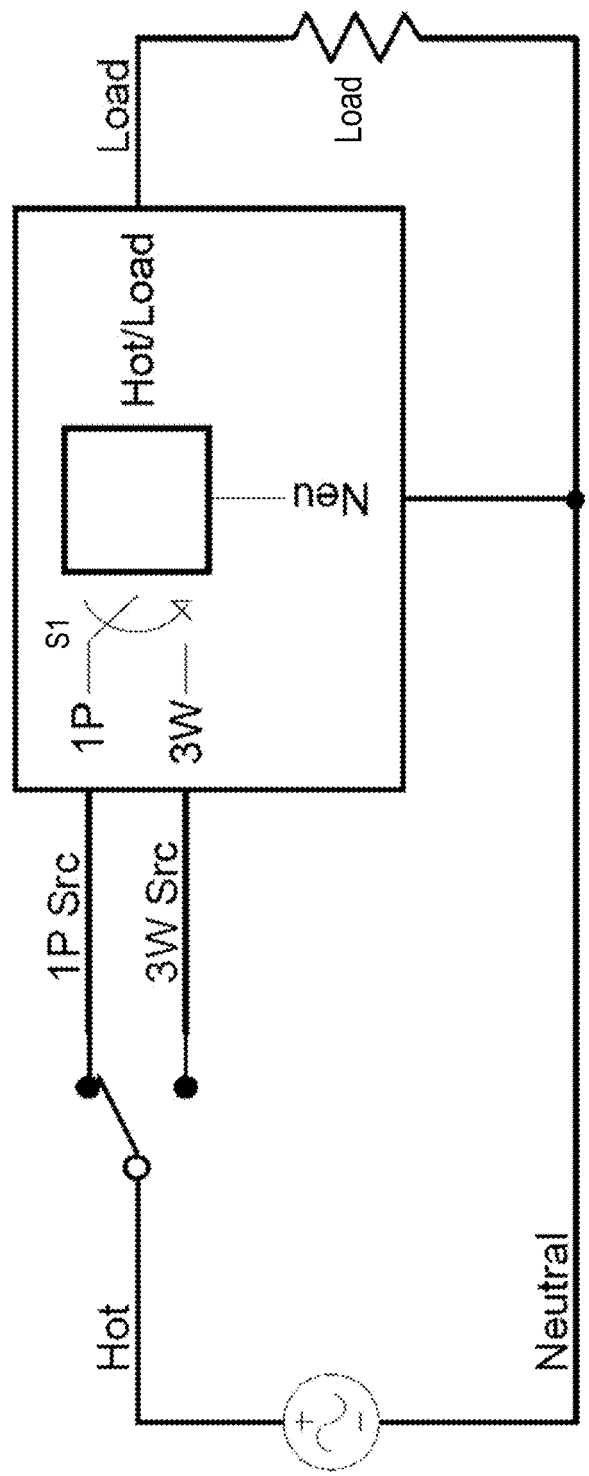
FIG. 6 is a wiring diagram of a dimmer depicting hot connected to one of the traveler terminals and the load attached to the HOT/LOAD terminal, according to an example.
Figure 7:
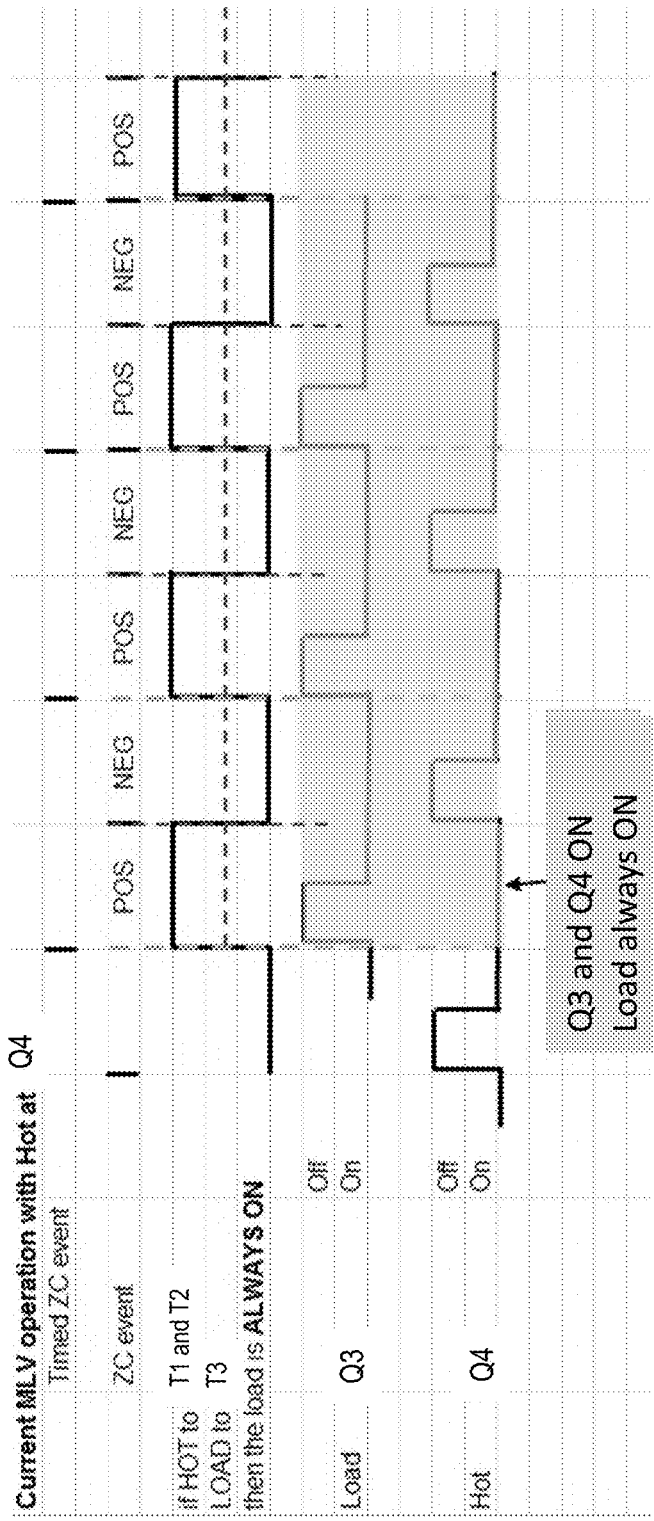
FIG. 7 is a timing diagram depicting magnetic low voltage applied to a miswired dimmer circuit, according to an example.

If the first firing sequence of FIG. 9 yielded no current flow during the second half of the positive and negative half-cycles, and the second firing sequence of FIG. 10 yields current flow during the second half of the positive and negative half-cycles, it can be determined conclusively that the HOT terminal of the dimmer is connected to the load. Stated differently, it can be determined that line HOT is connected to Q4 of the dimmer of FIGS. 1A-B (e.g., in the configuration of FIG. 6).

FIG. 11 depicts this same firing sequence of FIG. 10, but with HOT applied to Q3 rather than Q4. As shown, this will result in no current flow during the second half of the positive and negative half-cycles.

Thus, taken together, FIGS. 8 and 11 depict the result of the first and second firing sequences, respectively, when HOT is applied to Q3 and the load is applied to Q4. Conversely, FIGS. 9 and 10 depict the result of the first and second firing sequences, respectively, when HOT is applied to Q4 and the load is applied to Q3. Again, assuming that a load is connected, the first firing sequence will result in current flow only when HOT is applied to Q3, and the second firing sequence will result in current flow only when HOT is applied to Q4.

If current flow is detected during one of the first or second firing sequences, it is not necessary to run the other firing sequence. (E.g., if current is detected during the first firing sequence, it is not necessary to run the second firing sequence. Alternately, if the second firing sequence is run first, and current is detected, it is not necessary to run the first firing sequence.) If however, no current is detected during one of the first firing sequence or the second firing sequence, then it is necessary to either run the other firing sequence or to rely on the result of a load-detection algorithm, else the implication of the lack of current will be ambiguous. Stated differently, if a load-detection algorithm (such as the Auto-Cal feature of P&S dimmers) detects the presence of the load, it is only necessary to run one of the first firing sequence or the second firing sequence. If, for example, the second firing sequence is run (without the first firing sequence) and a load is detected by a load-detection algorithm, it can be determined that HOT is connected to Q4 if current is detected, and it can be determined that HOT is connected to Q3 if no current is detected (making it unnecessary to also run the first firing sequence).

Either of the first firing sequence or the second firing sequence can be applied in either order. It should also be understood that variations of the firing sequences are contemplated. For example, the order of the positive half-cycle and negative half-cycle tests can be reversed in either the first firing sequence or the second firing sequence. (For example, for the first firing sequence, the test applied during the negative half-cycle can be applied before the test applied to the positive half-cycle.)

Furthermore, although FIGS. 8-11 depict repeating the test over several half-cycles, it is only necessary to conduct the test long enough for the current-detection method (e.g., toroid or shunt) to detect the presence of current. Fewer half-cycles can be used.

In the above examples, PWM is used because a large inrush current would cause the FETs (Q3 and Q4) to overheat and fail. PWM is thus useful for sensing load current, without entering a high-current condition. However, in alternate embodiments, it is not necessary to begin each half-cycle with both Q3 and Q4 OFF. Rather, it is only necessary to implement the state depicted at the second half of the half-cycle. Indeed, it is contemplated that the state depicted during the second half of the positive and negative half-cycles of either of the firing sequences can be implemented over the entire half-cycle. For example, during the firing sequence of FIG. 8, during the positive half-cycle, Q3 can be turned ON and Q4 left OFF for the entirety of the positive half-cycle. Alternatively, it is contemplated that the state depicted during second half of the half-cycle occurs during the first half of the half-cycle, and both Q3 and Q4 are left OFF during the second half of the half-cycle. Furthermore, it is not necessary that the half-cycle be divided into halves. For example, during the positive half-cycle of FIG. 8, Q3 can be ON for 75% (or any other percent) of the half-cycle. The extent that PWM is used, and the beginning state of each half-cycle, will be determined, in part, by the inrush current and kickback that these variations will cause.

In addition, for either the first or second firing sequence, it is not strictly necessary to run the test for both half cycles. For example, only one of the positive half-cycle test or the negative half-cycle test can be run.

Figure 3:
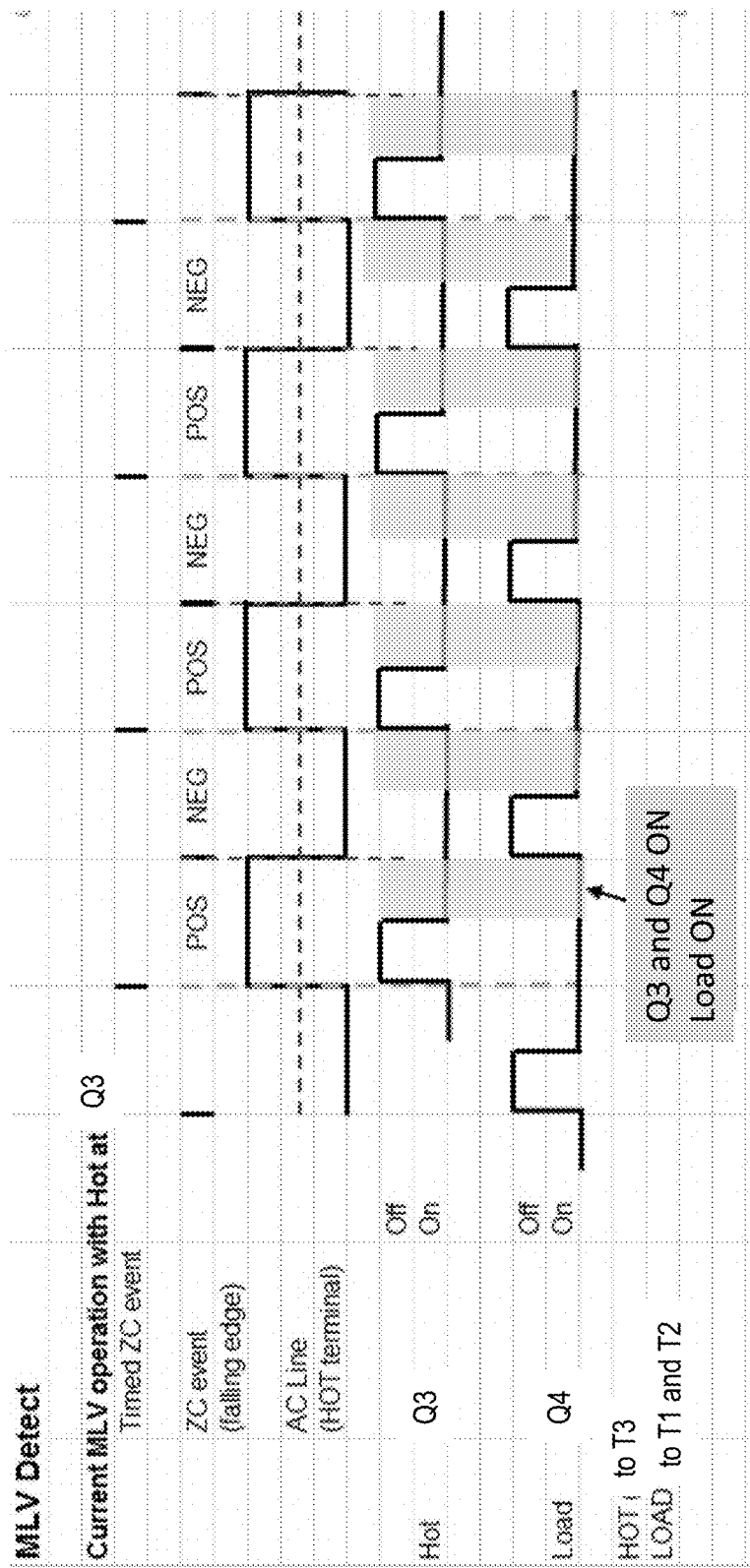
FIG. 3 is a timing diagram of magnetic low voltage mode, according to an example.
Figure 4:
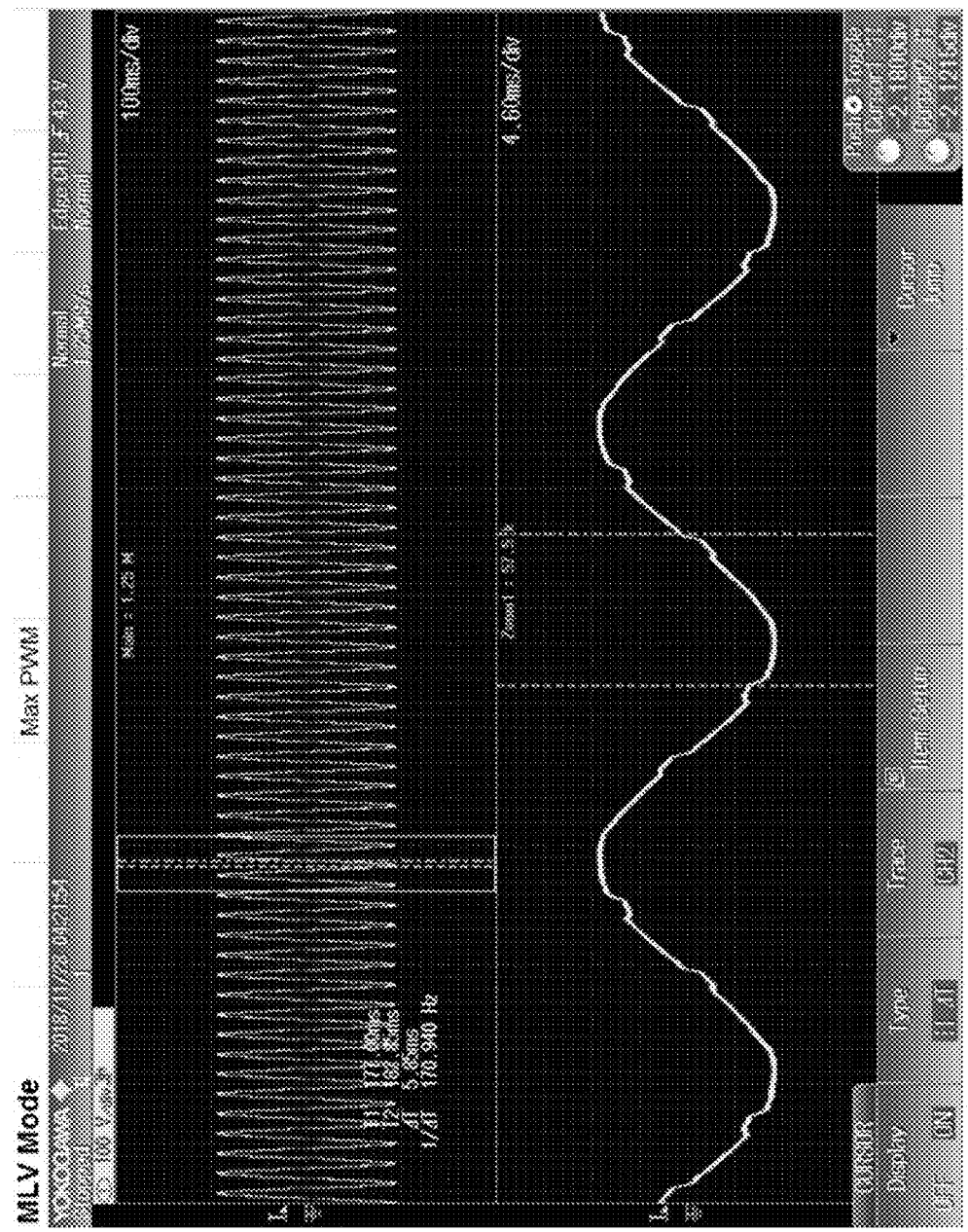
FIG. 4 is a plot showing a dimmer output signal resulting from magnetic low voltage mode, according to an example.

If the result of the tests administered in some combination of FIGS. 8-11 results in a determination that HOT is connected to Q3 and a load is present, then the MLV firing sequence depicted on the bottom half of FIGS. 8 and 11 (labeled "Selected WFM for FPC/MLV drive") is implemented. Unlike the test patterns in FIGS. 8 through 11, this waveform is an MLV control pattern that is designed to reduce or eliminate spikes in the load current when the device is properly wired. In this waveform, Q3 is ON during a portion of the positive half-cycle and Q4 is ON during the entirety of the half cycle. During the negative half-cycle, Q4 is ON during a portion of the half cycle and Q3 is ON during the entirety of the half cycle. To be clear, the "Selected WFM for FPC/MLV drive" waveforms at the bottom of FIGS. 8 through 11, do not directly correlate to the upper waveforms in the respective figures per se. The "Selected WFM for FPC/MLV drive" are merely the drives pattern that are chosen once the orientation of hot and load are established. (Indeed, the drive patterns can be selected once the location of line hot is determined. The location of line hot can be determined according to any method.) As an example, in FIG. 8, the drive pattern "Selected WFM for FPC/MLV drive" would result in load current in the later part of the positive and negative half cycles as illustrated in FIG. 8, however, with inductive kickback suppression (See FIG. 3). Whereas, if the result of the test determines that HOT is connected to Q4 and a load is present, then the MLV firing depicted at the bottom half of FIGS. 9 and 10 (again labeled "Selected WFM for FPC/MLV drive") is implemented. In this waveform, Q3 is ON during the entirety of the positive half-cycle and Q4 is ON during a portion of the half-cycle. During the negative half-cycle, Q3 is ON during a portion of the half-cycle and Q4 is ON during the entirety of the half cycle. Although the control patterns "Selected WFM for FPC/MLV drive" are described here as having the same name, they are indeed 2 different patterns from a controller's perspective, as can be seen from comparing FIG. 8 to FIG. 9. In this way, the proper MLV waveform can be selected regardless of the way the dimmer is wired, thus essentially, in additional, self correcting the orientation of the dimmer within the electrical wiring circuit.

What follows is pseudo-code example of the above-described method:

```
Control Overview:
After Autocal( ) - set dimmer to locate HOT source
Hot_Detect mode
   HOT_Detect_FET1 wfm sequence run
      if FET1 is connected to HOT then Load current detected
      if FET2 is connected to HOT then NO Load current detected
   if FET1 then use Hot_Fet1_Seq
   else us Hot_Fet2_seq
Exit Hot_Detect mode with correct "MLV" or now Forward Phase
Control sequence that will be for all Forward control dimming.
Control Overview for MLV load - Method A:
   1) Run Autocal - use Forward Phase control where both Q3 & Q4
      are on/off simultaneously and is used to not only verify a load is
      connected but set the low-end dimmer level PWM.
      If no load current - then no load connected, stop here, else continue
   2) Load is connected and is an inductive so must be driven so the
      kickback is suppressed.
      Run the Hot-Detection drive sequence and monitor the load current.
   Do Hot_Detect mode:
   HOT_Detect_FET1 wfm sequence run       //use wfm as in FIG. 6
         if FET1 is connected to HOT then Load current detected
         if FET2 is connected to HOT then NO Load current detected
      If FET1 = TRUE then use Hot_FET1_Sequence   //use "selected
      wfm for FPC/MLV" Fig 8
      Else use Hot_FET2_Sequence                 //use "selected
      wfm for FPC/MLV" Fig 9
   Exit with correct "MLV" or now Forward Phase Control where the
   normally off drive remains on to suppress and inductive load.
```

```
Control Overview for MLV load - Method B:
  1) Run Hot_Detect_FET1 wfm sequence
     if load current then FET1 is connected to HOT, use
     Hot_FET1_Sequence
        Autocal( )
     else Run Hot_Detect_FET2 wfm sequence
     if load current then FET2 is connected to HOT, use
     Hot_FET2_Sequence
        Autocal( )
     Else no load current found with either Hot_Detect_FET1 or
     Hot_Detect_FET2
        Then no load, loop looking for load current - back to step 1
  2) Run Autocal - use Hot_Detect_FET#_Sequence where load is
     found and set the low-end dimmer level PWM.
  3) Exit with correct "MLV" or now Forward Phase Control where the
     normally off drive remains on to suppress and inductive load.
```

Figure 12:
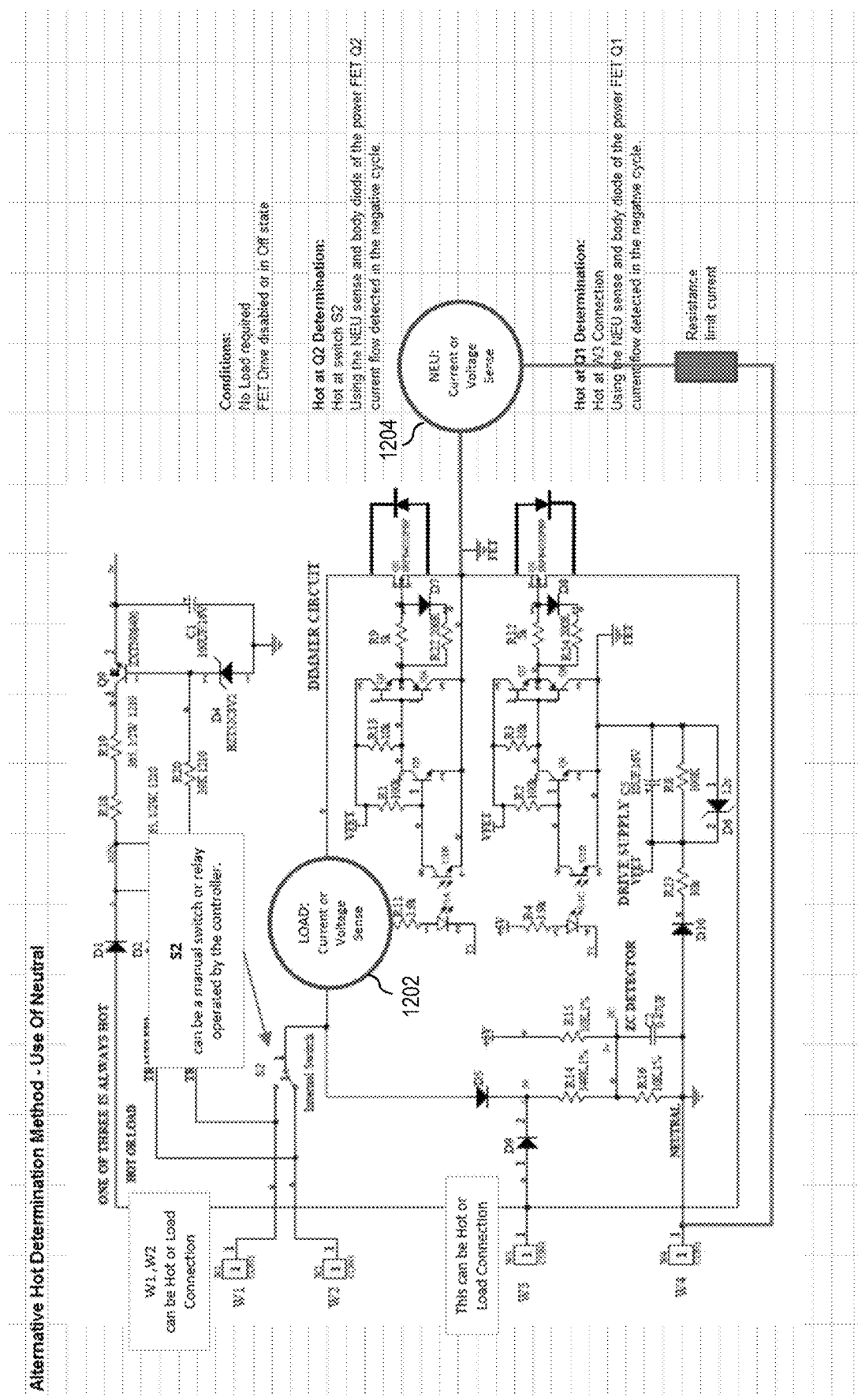
FIG. 12 is a dimmer circuit having sensors to determine the location of line hot, according to an example.

FIG. 12 is provided to show an alternative example of a dimmer in which current sensors and voltage sensors are provided to detect the wiring configuration of the dimmer. The wiring configuration can be determined for any suitable dimmer including the current sensors and voltage sensors described above. A person of ordinary skill in the art will appreciate and understand the operation of the dimmer of FIG. 12 and so further explanation will be omitted.

In an alternative example, rather than detecting a wiring configuration through sensors sensing a current or a voltage through the FETs or at a particular terminal, a wiring configuration can be detected through a detection circuit that detects a voltage existing between any set of terminals. Once the wiring configuration is detected, a wiring device can be configured to self-correct the terminals by readjusting the internal connections to the particular terminals of the wiring device or to take some other action.

Figure 13:
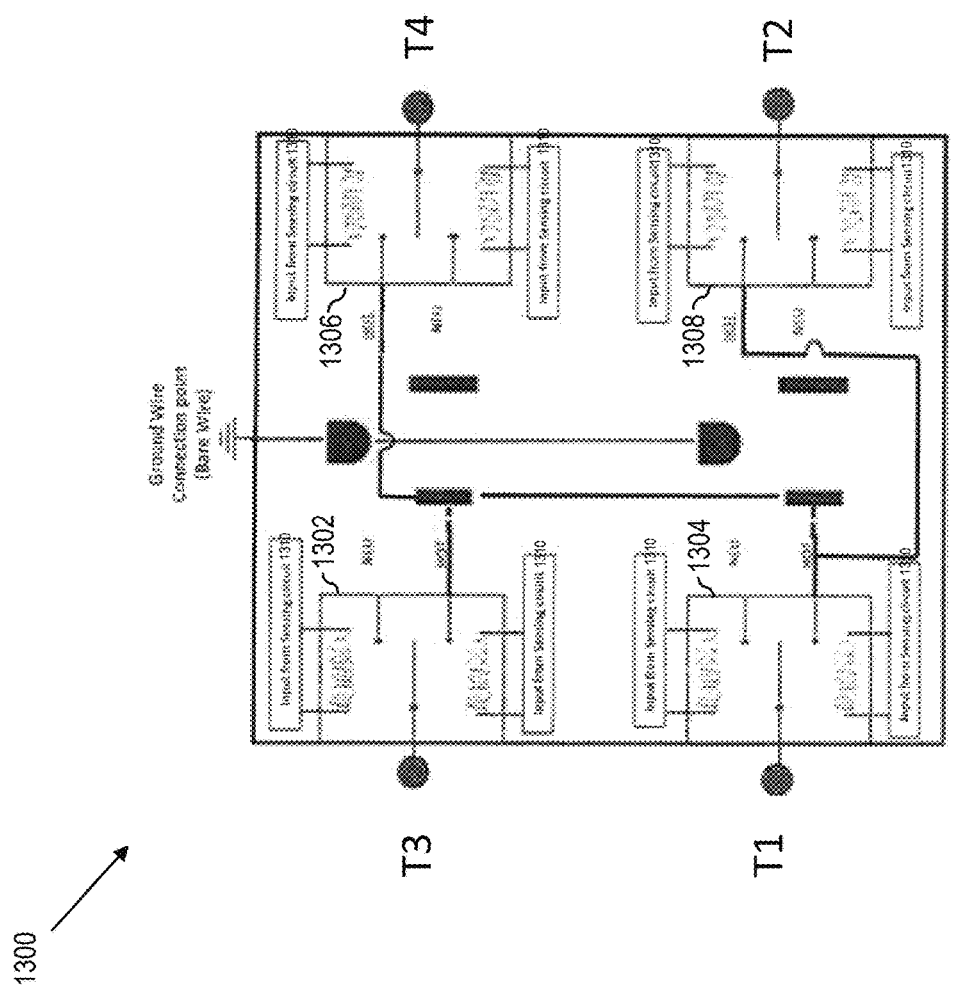
FIG. 13 is a schematic view of self-configuring dimmer, according to an example.

An example of such a device 1300 is shown in FIG. 13. In this example, the electrical wiring device includes two outlets each comprising a HOT receptacle, a NEU receptacle, and a GND receptacle. It should, however, be understood that the electrical wiring device can include any number of outlets. As is typical in electrical wiring devices, the HOT, NEU, and GND receptacles are tied together, as is shown in FIG. 13. However, in various other examples, electrical wiring device can be a split receptacle, in which the conductors that tie together the HOT, NEU, and GND receptacles are omitted. As shown, wiring device 1300 includes five terminals T1, T2, T3, T4, and GND for receiving one of a line hot, line neutral, load hot, and load neutral, and ground connection. Furthermore, wiring device 1300 includes relay circuits 1302, 1304, 1306, 1308 which are respectively associated with a terminal T1, T2, T3, and T4 (except for GND) and are each movable between a HOT position (in contact with at least one HOT receptacle) and a NEUTRAL position contact with at least one NEUTRAL receptacle). Sensing circuit 1310, identifies the wiring configuration of the electrical wiring device 1300 and drives the relays 1302, 1304, 1306, 108 to assume the proper wiring of the electrical wiring device based on the identified wiring configuration. Stated differently, once sensing circuit 1310 identifies the wiring connections to terminals T1, T2, T3, T4, sensing circuit 1300 drives relay between a HOT receptacle connection or a NEU receptacle connection such that electrical wiring device is properly wired.

Figure 14:
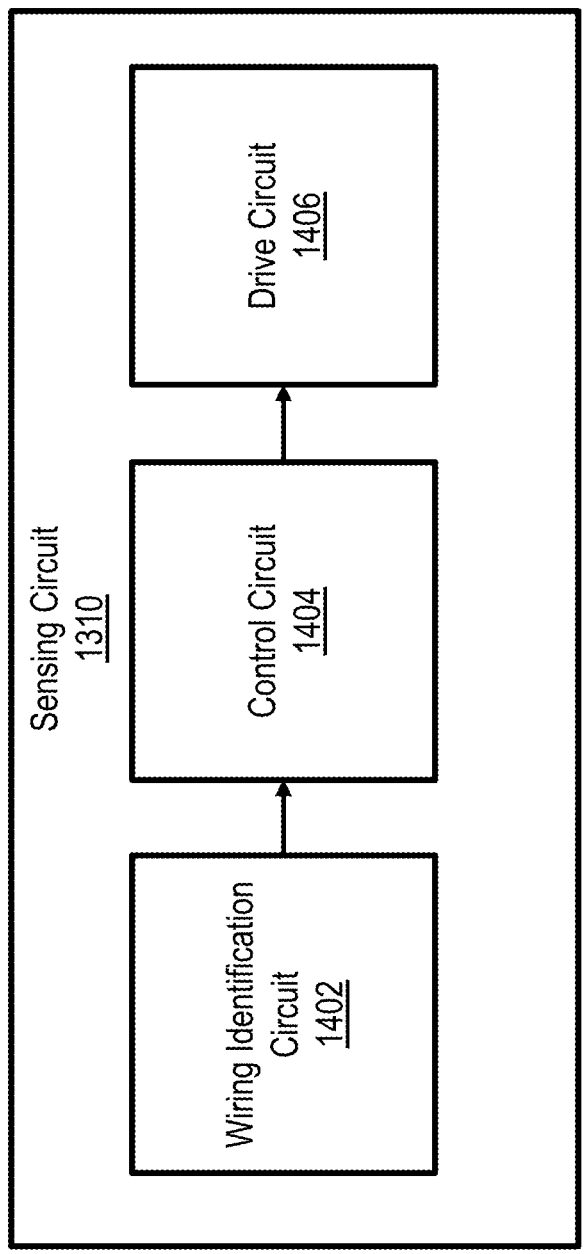
FIG. 14 is a block diagram of a sensing circuit, according to an example.

In one example, sensing circuit 1310, as shown in FIG. 14, can include a wiring identification circuit 1402, a control circuit 1404, and a drive circuit 1406. Wiring identification circuit 1402 identifies the connection of terminals T1, T2, T3, and T4 as will be described in detail in conjunction with FIG. 15. Control circuit 1404 is a microcontroller or a microprocessor or a logic-type circuit designed to interpret the input from wiring identification circuit and switches the relays, as appropriate for wiring device 1300 to assume the proper wiring configuration, via drive circuit 1406. Drive circuit 1406 comprises one or more drive circuits, as are known in the art, for driving relay circuits 1302, 1304, 1306, and 1308 based on the input from control circuit 1404. Such drive circuits are known in the art and thus are not described in further detail here.

FIGS. 15A-15D depict an example of wiring identification circuit 1402, which comprises sixteen wiring identification sub-circuits $1500_{T1,T2}$-$1500_{T4,GND}$. Each of the wiring identification sub-circuits $1500_{T1,T2}$-$1500_{T4,GND}$ connects a respective pair terminals T1, T2, T3, T4, and GND of wiring device 1300. Thus, $1500_{T1,T2}$ is connected between terminals T1 and T2, $1500_{T1,T3}$ is connected between terminals T1 and T3 and so on. The wiring identification sub-circuits $1500_{T1,T2}$-$1500_{T4,GND}$ connect every possible combination of terminals T1, T2, T3, T4, and GND. Each wiring identification sub-circuit $1500_{T1,T2}$-$1500_{T4,GND}$ is configured to detect when line hot and line neutral are connected to its associated terminals.

In the example shown in FIG. 13, at a high level, wiring identification sub-circuit includes an optocoupler with a photodiode side connected between one pair of terminals and a switch side that drives an output low (during the positive half-cycle) when the photodiode side is connected between line hot and line neutral. In this way, each wiring identification sub-circuit produces a LOW output when the terminals to which it is connected are attached to line hot and line neutral.

The parts and operation of wiring identification sub-circuit $1500_{T1,T2}$ will be described below; however, it should be understood that each wiring identification sub-circuit $1500_{T1,T2}$-$1500_{T4,GND}$ operates in the same way. Wiring identification sub-circuit $1500_{T1,T2}$ includes an input side connected between terminals T1 and T2. Input side includes diode $D_{T1,T2}$, resistor $R1_{T1,T2}$, and the photodiode side of optocoupler $U_{T1,T2}$. As described above, the photodiode side of optocoupler $U_{T1,T2}$ serves to produce an output signal at the output side when terminals T1 and T2 are connected between line hot and line neutral. Diode $D_{T1,T2}$ serves to limit current flow in only one direction and to limit noise spikes from reaching the photodiode. Resistor $R1_{T1,T2}$ limits current to within the levels acceptable by optocoupler $U_{T1,T2}$. The output side of wiring identification sub-circuit $1500_{T1,T2}$ is connected between DC supply (V$^+$) and DC ground (LVC$_{gnd}$) and includes resistor $R2_{T1,T2}$ and the switch side of optocoupler $U_{T1,T2}$. The output side of wiring identification sub-circuit $1500_{T1,T2}$ is configured as an inverter logic gate, providing a LOW output when the phototransistor is turned ON. The wiring identification sub-circuit $1500_{T1,T2}$ thus provides an input side that detects when terminals T1 and T2 are connected between line hot and line neutral and an output side, electrically isolated from the input side, that produces a DC LOW in response. The output side thus produces a digital output indicating a line HOT and line neutral connection to T1 and T2.

It should be understood that the example of the wiring identification sub-circuits $1500_{T1,T2}$-$1500_{T4,GND}$ provided in FIGS. 15A-15D are merely provided as examples of the kinds of wiring identification sub-circuits that could be implemented. For example, in one alternative, rather than a logic inverter on the output side, a logic buffer can be used by moving output side resistor $R2_{T1,T2}$ to the emitter side of the optocoupler $U_{T1,T2}$ switch. This will provide a logic HIGH when the terminals T1 and T2 are connected between line HOT and line NEUTRAL and a LOW otherwise. In various examples, diode $D_{T1,T2}$ can be omitted and other circuits to limit current flow can be used besides input side resistor R1. Indeed, it is only necessary that each wiring identification sub-circuit $1500_{T1,T2}$-$1500_{T4,GND}$ be connected between a pair of terminals of the electrical wiring device and that it produces an output representative of a connection between line hot and line neutral that can provide an output suitable for input to a control circuit. For example, in an alternative example, the optocouplers can be replaced with a transformer that provides isolation between the input side and output side of each wiring identification sub-circuit.

An example of the operation of wiring identification circuit 1402 will be described in connection with Table 3 provided below. Table 3 provides a representative set of possible connections of line hot, line neutral, load hot, and load neutral to terminals T1-T4. The connections of Table 3 are just provided as an example for the purposes of explanation; a person of ordinary skill in the art will recognize that other connections besides those described in Table 3 are possible.

The first set of columns, labeled T1-T4, represent the wiring connections to terminals T1-T4. The next set of columns represent the outputs of the wiring identification sub-circuits $1500_{T1,T2}$-$1500_{T4,GND}$. Thus, in the first part of table 3, titled "FIG. 15A Connections/Outputs," the columns labeled A1 represent the A1 output of wiring identification sub-circuit $1500_{T1,T2}$. Similarly the columns labeled A2 under "FIG. 15B Connection/Outputs" represent the A2 output of wiring identification sub-circuit $1500_{T2,T1}$. Each wiring identification sub-circuit $1500_{T1,T2}$-$1500_{T4,GND}$ output is represented for the positive half-cycle and the negative half-cycle. Thus, there are two columns for A1: A1-P (for the positive half cycle, and A1-N (for the negative half cycle). The outputs of each are represented digitally (0 for a LOW output, meaning that the switch of the optocoupler is conducting and 1 for a HIGH output, meaning that the switch of the optocoupler is not conducting. An "x" in the column represents an open connection, meaning that the terminals are not connected to line hot and line neutral. This will appear the same as a HIGH output but is being represented as an "x" for the purposes of explanation).

TABLE 3

Figure 15A:
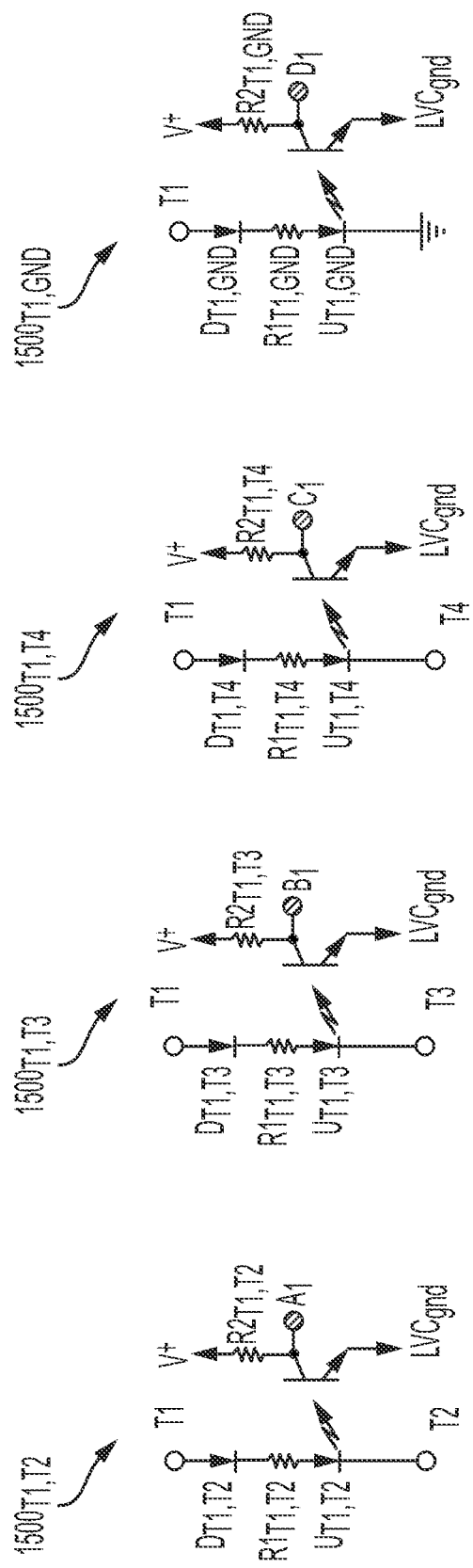
FIG. 15A is a schematic of a set of wiring identification sub-circuits, according to an example.

| FIG. 15A Connections/Outputs | | | | | | | | | | | |
|---|---|---|---|---|---|---|---|---|---|---|---|
| T1 | T2 | T3 | T4 | A1-P | A1-N | B1-P | B1-N | C1-P | C1-N | D1-P | D1-N |
| Line-H | Line-N | Load-H | Load-N | 0 | 1 | x | x | x | x | 0 | 1 |
| Line-N | Line-H | Load-N | Load-H | 1 | 0 | x | x | x | x | x | x |
| Load-H | Load-N | Line-H | Line-N | x | x | x | x | x | x | x | x |
| Load-N | Load-H | Line-N | Line-H | x | x | x | x | x | x | x | x |
| Line-H | Load-H | Line-N | Load-N | x | x | 0 | 1 | x | x | 0 | 1 |
| Line-N | Load-N | Line-H | Load-H | x | x | 1 | 0 | x | x | x | x |

Figure 15B:
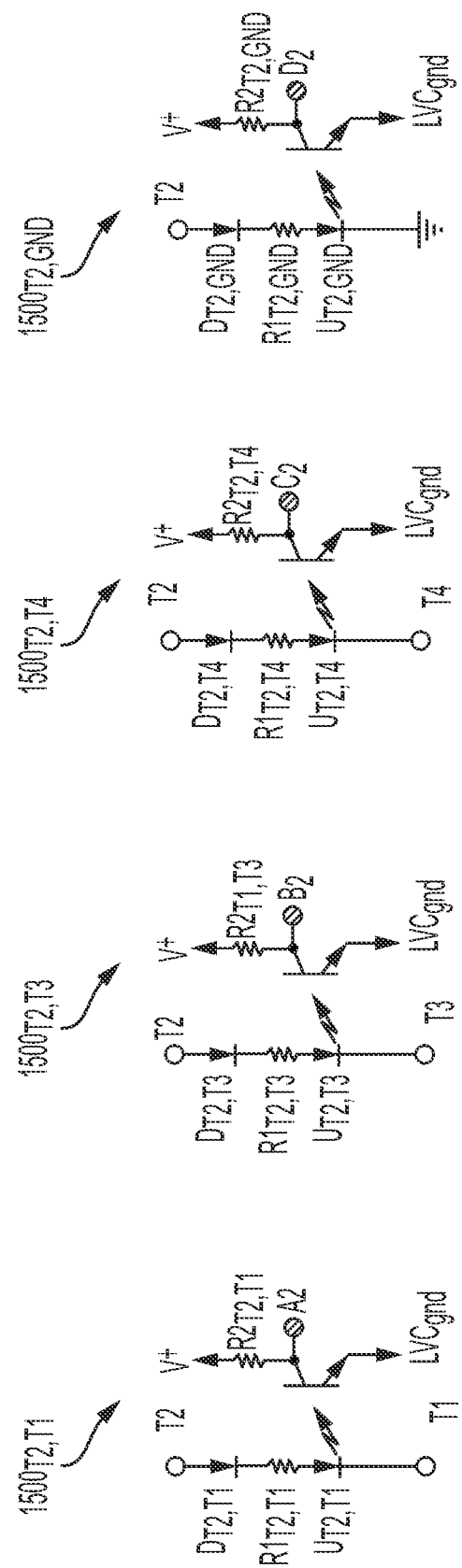
FIG. 15B is a schematic of a set of wiring identification sub-circuits, according to an example.

| FIG. 15B Connections/Outputs | | | | | | | | | | | |
|---|---|---|---|---|---|---|---|---|---|---|---|
| T1 | T2 | T3 | T4 | A2-P | A2-N | B2-P | B2-N | C2-P | C2-N | D2-P | D2-N |
| Line-H | Line-N | Load-H | Load-N | 1 | 0 | x | x | x | x | x | x |
| Line-N | Line-H | Load-N | Load-H | 0 | 1 | x | x | x | x | 0 | 1 |
| Load-H | Load-N | Line-H | Line-N | x | x | x | x | x | x | x | x |
| Load-N | Load-H | Line-N | Line-H | x | x | x | x | x | x | x | x |
| Line-H | Load-H | Line-N | Load-N | x | x | x | x | x | x | x | x |
| Line-N | Load-N | Line-H | Load-H | x | x | x | x | x | x | x | x |

Figure 15C:
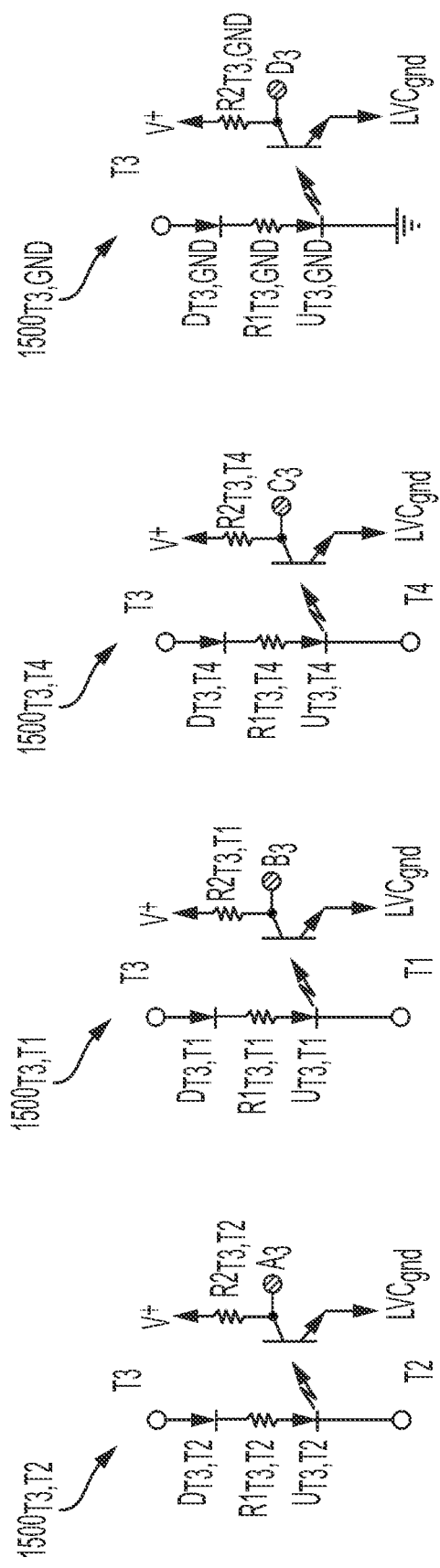
FIG. 15C is a schematic of a set of wiring identification sub-circuits, according to an example.

| FIG. 15C Connections/Outputs | | | | | | | | | | | |
|---|---|---|---|---|---|---|---|---|---|---|---|
| T1 | T2 | T3 | T4 | A3-P | A3-N | B3-P | B3-N | C3-P | C3-N | D3-P | D3-N |
| Line-H | Line-N | Load-H | Load-N | x | x | x | x | x | x | x | x |
| Line-N | Line-H | Load-N | Load-H | x | x | x | x | x | x | x | x |
| Load-H | Load-N | Line-H | Line-N | x | x | x | x | 0 | 1 | 0 | 1 |
| Load-N | Load-H | Line-N | Line-H | x | x | x | x | 1 | 0 | x | x |
| Line-H | Load-H | Line-N | Load-N | x | x | 1 | 0 | x | x | x | x |
| Line-N | Load-N | Line-H | Load-H | x | x | 0 | 1 | x | x | 0 | 1 |

Figure 15D:
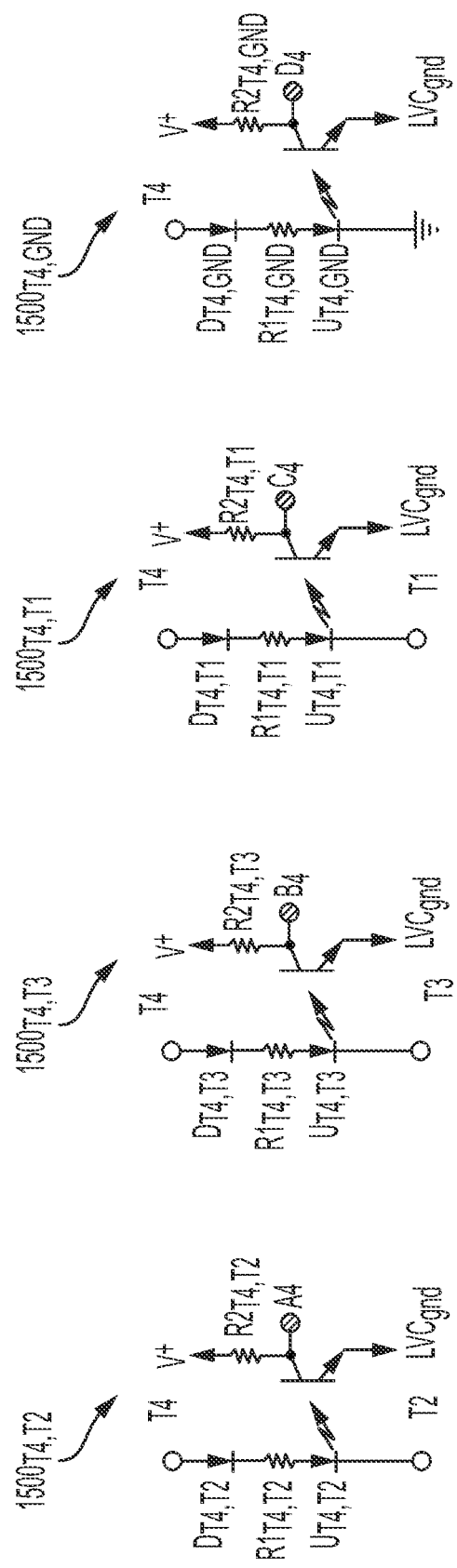
FIG. 15D is a schematic of a set of wiring identification sub-circuits, according to an example.

| FIG. 15D Connections/Outputs | | | | | | | | | | | |
|---|---|---|---|---|---|---|---|---|---|---|---|
| T1 | T2 | T3 | T4 | A4-P | A4-N | B4-P | B4-N | C4-P | C4-N | D4-P | D4-N |
| Line-H | Line-N | Load-H | Load-N | x | x | x | x | x | x | x | x |
| Line-N | Line-H | Load-N | Load-H | x | x | x | x | x | x | x | x |
| Load-H | Load-N | Line-H | Line-N | x | x | 1 | 0 | x | x | x | x |
| Load-N | Load-H | Line-N | Line-H | x | x | 0 | 1 | x | x | 0 | 1 |
| Line-H | Load-H | Line-N | Load-N | x | x | x | x | x | x | x | x |
| Line-N | Load-N | Line-H | Load-H | x | x | x | x | x | x | x | x |

Turning to the first row of FIG. 15A, a correct wiring configuration is shown. In this configuration T1 is connected to line hot, T2 is connected to line neutral, T3 is connected to load hot, and T4 is connected load neutral. During the positive half cycle, the output A1 will be LOW because the phototransistor of $U_{T1,T2}$ is conducting due to the application of line hot to T1 and Line Neutral to T2. During the negative half cycle, however, the output of A1 will be HIGH, because line hot is a negative voltage with respect to line neutral. The output of A1 is the same but reversed if T2 is connected to line hot and T1 is connected to line neutral; that is, during the positive half cycle A1 is HIGH and during the negative half cycle A1 is LOW. Control circuit 1404, receiving the output of A1, will be unable to determine whether T1 is connected to line hot or T1 is connected to line neutral (in both instances, the output of A1 will appear as a 60 Hz square wave), unless control circuit 1404 has some other indication of the connection of line hot or the occurrence of the positive or negative half-cycle.

To identify whether T1 or T2 is connected to line hot, control circuit 1404 can monitor the output of D1, which represents the output of wiring identification sub-circuit $1500_{T1,GND}$. Because the connection between line hot and GND will result in 60 Hz square output from D1, this waveform can be monitored to identify whether T1 is connected to line hot or line neutral. Thus, if A1 is outputting a 60 Hz square wave and D1 is also outputting a 60 Hz square wave, it can be determined that T1 is connected to line hot and T2 is connected to line neutral. By contrast, if A1 is outputting a 60 Hz square wave, but D1 is not outputting a 60 Hz square, it can be determined that T1 is connected to line neutral and T2 is connected to line hot. The output of D1, in this example, can also operate as a sort of zero-cross detector, identifying the location of the positive half cycle. For example, rather than identifying the existence of a 60 Hz square wave output from D1, control circuit 1404 can monitor D1 to ascertain whether the output of D1 coincides with the output A1 (e.g., both A1 and D1 are LOW at the same time). In this way, control circuit 1404 monitors D1 to identify the location of the positive half-cycle. In either instance, a connection between D1 is used to resolve an ambiguous output from A1. This example assumes the correct wiring of the GND terminal to earth ground, which is a reasonable expectation since the ground wiring is the easiest to identify as its a bare metal wire and thus readily distinguishable from the remaining wires during wiring.

A two-part system may be necessary for a higher level of zero cross precision, where the outputs D1-D4 would be the front-end interface to which a filter section having a correction factor would be applied. The correction factor may be needed to compensate for the delay caused by the transfer within the photo coupler. In an example, each of the D1-D4 outputs can be routed to a common second stage, which can be used as the sole zero-cross detection signal by control circuit 1404. The outputs of D1-D4 can be prevented from feeding back into each other with a diode placed at each output serving as a buffer.

Turning briefly to the operation of control circuit 1404, in the simplest example, control circuit 1404 is a microcontroller including sixteen inputs, each input receiving an output from a respective wiring identification sub-circuit $1500_{T1,T2}$-$1500_{T4,GND}$. Control circuit 1404 compares the inputs to a look up table and controls drive circuit 1406 to trigger relays accordingly. For example, if, as described in the above example, the output of A1 is a 60 Hz square wave, and, by monitoring D1 or D2, it is determined that T1 is connected to Line Neutral and T2 is connected to line hot (e.g., if the look-up table corresponds to the second configuration of Table 3), control circuit 1404 can, by consulting the stored look-up table, control drive circuit 1406 to drive relays 1304 and 1308 to connect T1 to the NEUT face receptacle and T2 to the HOT face receptacle, thus correcting the wiring configuration. To provide another example, if the output of C3 and D3 are both 60 Hz square waves, it can be determined, unambiguously, that line hot is connected to T3 and line neutral is connected to T4, so relays 1306 and 1308, control circuit 1404 can control drive circuit 1406 to drive relays 1302 and 1306 to connect T3 to the HOT face receptacles and the T4 to the NEUTRAL face receptacles. As described above, this can also be accomplished through a logic circuit, or other suitable circuit for responding to the outputs of $1500_{T1,T2}$-$1500_{T4,GND}$ to control drive circuits 1406 to reconfigure the terminals into the correct orientation.

It will be apparent to a person of ordinary skill in the art that all sixteen wiring identification sub-circuits $1500_{T1,T2}$-$1500_{T4,GND}$ are not necessary to unambiguously determine the location of line hot and line neutral. For example, the output using the outputs A1 and D1 of $1500_{T1,T2}$ and $1500_{T1,GND}$, respectively, it can be determined unambiguously if T1 is connected to line hot and T2 is connected to line neutral or if T1 is connected to line neutral and T2 is connected to line hot. The same information can be derived from A2 and D2 of $1500_{T2,T1}$ and $1500_{T2,GND}$. Thus, one of $1500_{T1,T2}$ and $1500_{T2,T1}$ can be omitted and one of $1500_{T1,GND}$ and $1500_{T2,GND}$ can be omitted, without losing any capacity to determine if unambiguously if T1 is connected to line hot and T2 is connected to line neutral or if T1 is connected to line neutral and T2 is connected to line hot. In this way, it unnecessary to retain to more than one wiring identification sub-circuit 1500 between any pair of terminals. Furthermore, in one example, connections used to determine the correct wiring configuration (i.e., the first row of Table 3) can be omitted, since no action is required for the correct wiring. For the purposes of this disclosure, unless otherwise stated, examples including identification sub-circuits $1500_{T1,T2}$-$1500_{T4,GND}$ can be implemented with fewer than all sixteen sub-circuits.

Figure 16:
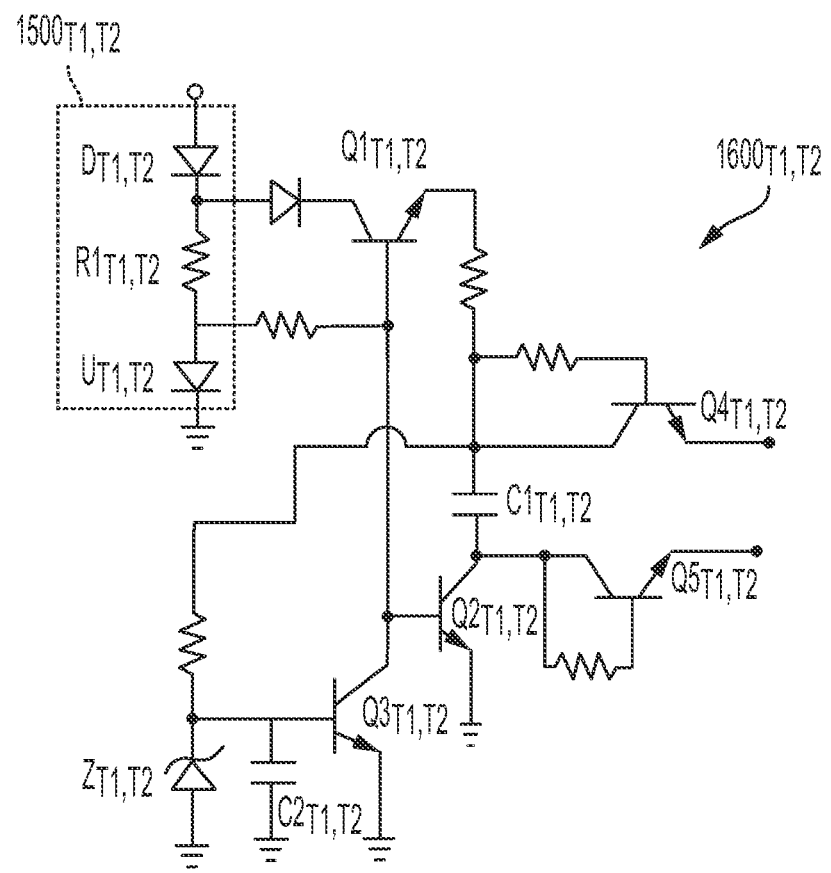
FIG. 16 is a schematic of a power supply circuit, according to an example.
Figure 17A:
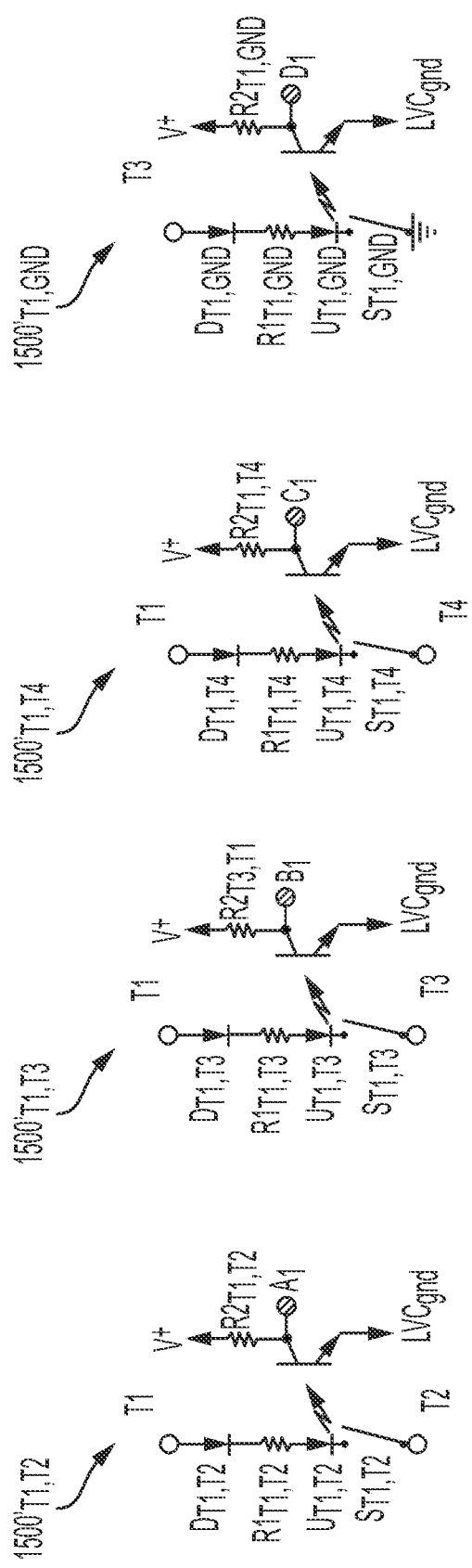
FIG. 17A is a schematic of a set of wiring identification sub-circuits, according to an example.
Figure 17B:
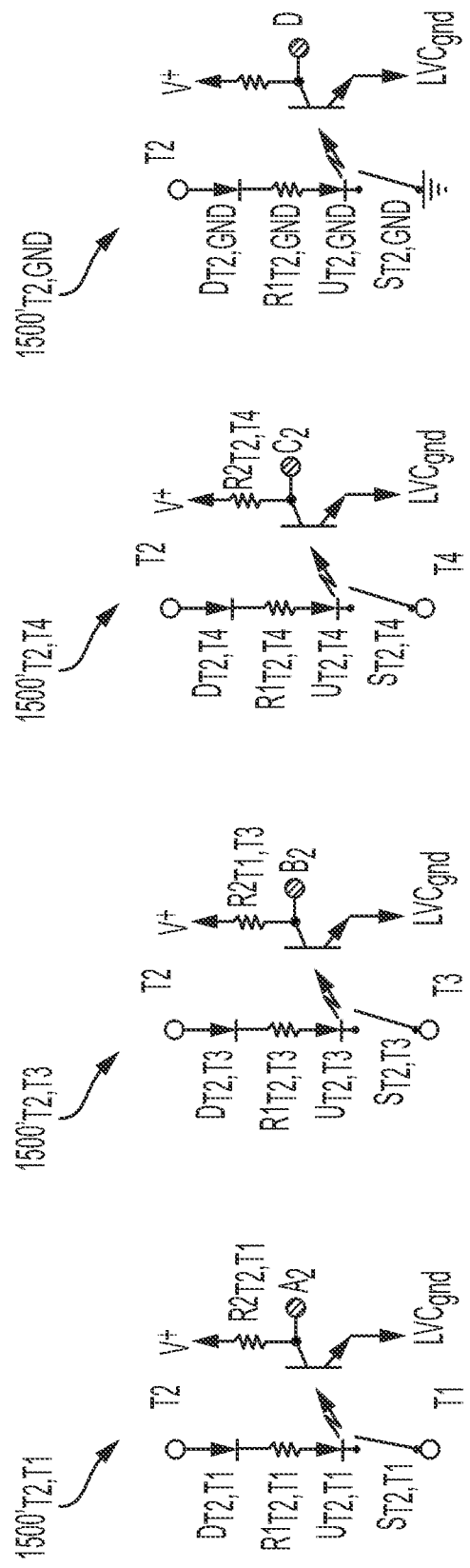
FIG. 17B is a schematic of a set of wiring identification sub-circuits, according to an example.

As alluded to above, in order for each of the wiring identification sub-circuits $1500_{T1,T2}$-$1500_{T4,GND}$ to operate, the output side requires a DC voltage V$^+$ and a DC ground LVC$_{GND}$. Generating this voltage is problematic because the location of line hot and line neutral is unknown. Accordingly, a battery can be employed in electrical wiring device 1300 to supply V$^+$ and DC ground. The battery can be, in an example, rechargeable by a solar panel or source. Alternatively, the DC voltage V+ and DC ground can be supplied by the solar panel. In yet another example, a DC supply circuit can be wired between the possible connections of terminals T1, T2, T3, and T4. For example, FIG. 16 shows as an example of a power supply circuit 1600 disposed between terminals T1 and T2. When T1 is connected line hot and T2 is connected to line neutral, BJTs Q1$_{T1,T2}$ and Q2$_{T1,T2}$ will be turned ON by the HIGH voltage at optocoupler U$_{T1,T2}$, beginning to charge capacitors C1$_{T1,T2}$ and C2$_{T1,T2}$. Once the voltage across capacitor C2$_{T1,T2}$ reaches the breakdown voltage of Zener Z$_{T1,T2}$, capacitor C2$_{T1,T2}$ begins to charge, turning on BJT Q3$_{T1,T2}$, thus turning off BJTs Q1$_{T1,T2}$ and Q2$_{T1,T2}$, and, thereafter, turning BJTs Q4$_{T1,T2}$ and Q5$_{T1,T2}$ ON. When this occurs, the voltage stored across capacitor C1$_{T1,T2}$ is applied to the V$^+$ and LVC$_{gnd}$ terminals of wiring identification sub-circuits $1500_{T1,T2}$-$1500_{T4,GND}$. Power supply circuit 1600 can be implemented across each combination of terminals such that the terminals connected to line hot and line neutral will ultimately charge capacitor C1 and provide power to the output side of wiring identification sub-circuits $1500_{T1,T2}$-$1500_{T4,GND}$. The power supply circuit 1600 retains the isolation between the input side and output side of the wiring As described above, in one example, the set of wiring identification sub-circuits $1500_{T1,T2}$-$1500_{T4,GND}$ could produce sixteen individual inputs for control circuit 1404. (Of course, this number could be lower if certain wiring identification sub-circuits were omitted, as described above.) In either case, this high number of inputs is undesirable because it requires a microcontroller or other circuit that can receive sixteen unique inputs. Thus, to minimize the number of inputs to control circuit 1404, a set of switches can be operably positioned to interrupt power flow in each wiring identification sub-circuit $1500_{T1,T2}$-$1500_{T4,GND}$, and consequently, prevent the wiring identification sub-circuit from producing an output. Such a set of switches is shown, in an example, in FIG. 17, which depicts wiring identification sub-circuits $1500'_{T1,T2}$-$1500'_{T4,GND}$ having additional switches $S_{T1,T2}$-$S_{T4,GND}$. (Switches can be implemented as mechanical switches, MOSFETs, BJTs, or any other suitable switch). In alternative examples, the switch can be placed at any point sufficient for interrupting power on either the input side or output side of the wiring identification sub-circuit $1500'_{T2,T1}$-$1500'_{T4,GND}$. With this configuration, various outputs of wiring identification sub-circuits $1500'_{T2,T1}$-$1500'_{T4,GND}$ can be denied to control circuit 1404. As a result, control circuit 1404 can accept inputs from each wiring identification sub-circuit $1500'_{T2,T1}$-$1500'_{T4,GND}$ at fewer inputs. For instance, control circuit can include five inputs, four for inputs D1-D4 (as these are used for zero-cross detection) and a fifth to which the remaining inputs A1-A3, B1-B3, C1-C3 can be attached. The wiring identification sub-circuits $1500'_{T1,T2}$-$1500'_{T4,T1}$, producing A1-A3, B1-B3, C1-C3 can supply outputs one at a time to the fifth input by turning the associated switch on one at a time. For example, switch $S_{T1,T2}$ can be enabled first, providing an output for the input of control circuit, after which switch $S_{T1,T2}$ can be disabled and switch $S_{T1,T3}$ can be enabled, and so on. This effectively multiplexes the inputs to control circuit, requiring fewer inputs than otherwise required. In an alternative example, the four inputs can be used. These can be A1, B1, C1, and D1, which can then be multiplexed to A2, B2, C2, and D2, followed by A3, B3, C3, and D3, and finally A4, B4, C4, and D4. In yet another example, only two inputs to control circuit 1404 can be used, with D1-D4 being tied to one to input and the remaining outputs tied to another and switched on one at a time. The output of D1-D4 producing a signal can be isolated first and then the remaining inputs A1-A3, B1-B3, and C1-C3 can be multiplexed to the second input and compared to the D input.

In addition to multiplexing the outputs, switches $S_{T1,T2}$-$S_{T4,GND}$ can be used to prevent wiring identification sub-circuits $1500_{T1,T2}$-$1500_{T4,GND}$ from consuming power when wiring device 1300 is not identifying the wiring configuration. As described above, switches $S_{T1,T2}$-$S_{T4,GND}$ can be turned ON long enough to register an output from which the wiring identification sub-circuit $1500_{T1,T2}$-$1500_{T4,GND}$ (e.g., a single cycle). When the wiring identification sub-circuits $1500_{T1,T2}$-$1500_{T4,GND}$ are not being used, switches $S_{T1,T2}$-$S_{T4,GND}$ can remain open, thus preventing the consumption of power.

In the above examples, switches $S_{T1,T2}$-$S_{T4,GND}$ can be controlled by control circuit 1404. Of course, this would require the control circuit 1404 to itself be powered. Accordingly, control circuit 1404 can be powered by the same source of power supplying $V^+$ and $LVC_{gnd}$, as described above, or by a separate source of power.

While wiring identification circuit 1402 is described in conjunction with control circuit 1404 and drive circuit 1406, in an alternative embodiment, wiring identification circuit 1402 can be used as a part of a miswire identification circuit that triggers a circuit interrupt and/or notifies a user of a miswire condition. One such protective circuit having miswire protection is described in U.S. Pat. No. 9,819,177 titled "Protective Device with Non-Volatile Memory Miswire Circuit," the entirety of which is incorporated by reference.

The circuit described therein trips the circuit interrupter, interrupting power between the line terminals and load terminals. Control circuit 1404, in an alternative example, rather than drive relay circuit 1406, can trip a circuit interrupter or illuminate an LED to notify a user. In an alternative example, or in the same example, control circuit 1404 can connect (either directly, via, e.g., bluetooth, or through a remote server) to a mobile device or other device to notify a user of the identified wiring configuration. For example, a mobile device can depict the actual identified wiring and suggest ways that the wiring could be corrected, such as by providing a step-by-step guide to correct the wiring of wiring device 1300. Furthermore, a dimmer, similar in structure to dimmer 100 of FIGS. 1A-B or FIG. 12 can implement the wiring identification circuit 1402 to determine whether to apply an MLV mode.

While several inventive embodiments have been described and illustrated herein with reference to certain exemplary embodiments, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein (and it will be understood by one skilled in the art that various changes in detail may be effected therein without departing from the spirit and scope of the invention as defined by claims that can be supported by the written description and drawings). More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Further, where exemplary embodiments are described with reference to a certain number of elements it will be understood that the exemplary embodiments can be practiced utilizing either less than or more than the certain number of elements.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if not directly attached to where there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device comprising:
   a housing assembly including a plurality of terminals at least partially disposed therein, the plurality of terminals including a HOT/LOAD terminal, a NEUTRAL terminal, a first traveler terminal, and a second traveler terminal, wherein, when in use, at least one of the terminals is connected to line hot;
   at least one variable control mechanism coupled to the housing assembly, the at least one variable control mechanism being configured to adjustably select a user adjustable load setting, the user adjustable load setting being adjustable between a minimum setting and a maximum setting;
   a first series FET and a second series FET disposed in series between the HOT/LOAD terminal and one of the first traveler terminal or the second traveler terminal;
   at least one of a first sensor producing a first sensor output according to current flow or a voltage at the one of the first traveler terminal or the second traveler terminal and a second sensor producing a second sensor output according to current flow through the NEUTRAL terminal or according to a voltage between the first series FET and second series FET; and
   a controller configured to determine to which of the plurality of terminals line hot is connected based, at least, on the first sensor output or the second sensor output and to provide, during dimming operation, at least one of a first control signal to the first series FET and a second control signal to the second series FET according to the user adjustable load setting.

2. The electrical wiring device of claim 1, wherein the first control signal and the second control signal are provided to the first series FET and the second series FET in accordance with a first dimming sequence or a second dimming sequence, based on, at least, to which of the plurality of terminals line is connected.

3. The electrical wiring device of claim 2, wherein the first dimming sequence and the second dimming sequence are each configured to eliminate or reduce current spikes in a load current.

4. The electrical wiring device of claim 2, wherein the first dimming sequence is selected if line hot is determined to be connected to the HOT/LOAD terminal, wherein, in the first dimming sequence, the first series FET is ON during at least a portion of a positive half cycle of line hot and the second series FET is ON during the positive half cycle.

5. The electrical wiring device of claim 2, wherein the second dimming sequence is selected if line hot is determined to be connected to one of the first traveler terminal or the second traveler terminal, wherein, in the second dimming sequence, the first series FET is ON during a positive half cycle of line hot and the second series FET is ON during at least a portion of the positive half cycle.

6. The electrical wiring device of claim 1, wherein the first control signal and the second control signal are the same.

7. The electrical wiring device of claim 1, wherein the controller is further configured to apply, when determining to which of the plurality of terminals line hot is connected, a control sequence to a gate of the first series FET and to a gate of the second series FET, wherein the controller determines to which of the plurality of terminals line hot is connected by monitoring the first sensor output or the second sensor output while the control sequence is applied.

8. The electrical wiring device of claim 7, wherein the controller determines that line hot is connected to the HOT/LOAD terminal if the first sensor output indicates current flow through or a voltage at the one of the first traveler terminal or the second traveler terminal when, as a first part of the control sequence, the first series FET is ON and the second series FET is OFF in a first positive half-cycle of line hot or the first series FET is OFF and the second series FET is ON in a first negative half-cycle of line hot.

9. The electrical wiring device of claim 8, wherein the controller determines that line hot is connected to the one of the first traveler terminal or the second traveler terminal if the first sensor output indicates no current flow through or no voltage at the one of the first traveler terminal or the second traveler terminal during the first part of the control sequence and the first sensor output indicates current flow through or a voltage at the one of the first traveler terminal or the second traveler terminal when, as a second part of the control sequence, the first series FET is OFF and the second series FET is ON in a second positive half cycle of line hot or the first series FET is ON and the second series FET is OFF in a second negative half-cycle of line hot.

10. The electrical wiring device of claim 9, wherein the first part of the control sequence occurs after the second part of the control sequence.

11. The electrical wiring device of claim 9, wherein the first positive half cycle is the same as the second positive half cycle and the first negative half cycle is the same as the second negative half cycle.

12. The electrical wiring device of claim 7, wherein the controller determines that line hot is connected to the one of the first traveler terminal or the second traveler terminal if the first sensor output indicates current flow through or a voltage at the one of the first traveler terminal or the second traveler terminal when, as part of the control sequence, the first series FET is OFF and the second series FET is ON in a positive half cycle of line hot or the first series FET is ON and the second series FET is OFF in a negative half cycle of line hot.

13. The electrical wiring device of claim 7, wherein the controller determines that line hot is connected to the HOT/LOAD terminal if the second sensor output indicates current flow through the NEUTRAL terminal or a voltage between the first series FET and second series FET when the first series FET is ON and the second series FET is OFF in a first positive half-cycle of line hot or the first series FET is OFF and the second series FET is ON in a first negative half-cycle of line hot.

14. The electrical wiring device of claim 13, wherein the controller determines that line hot is connected to the one of the first traveler terminal or the second traveler terminal if the second sensor output indicates no current flow through the NEUTRAL terminal or no voltage between the first series FET and second series FET during the first part of the control sequence and the second sensor output indicates current flow through the NEUTRAL terminal or a voltage between the first series FET and second series FET when, as a second part of the control sequence, the first series FET is OFF and the second series FET is ON in a second positive half cycle of line hot or the first series FET is ON and the second series FET is OFF in a second negative half-cycle of line hot.

15. The electrical wiring device of claim 14, wherein the first part of the control sequence occurs after the second part of the control sequence.

16. The electrical wiring device of claim 14, wherein the first positive half cycle is the same as the second positive half cycle and the first negative half cycle is the same as the second negative half cycle.

17. The electrical wiring device of claim 7, wherein the controller determines that line hot is connected to the one of the first traveler terminal or the second traveler terminal if the second sensor output indicates current flow through the NEUTRAL terminal or a voltage between the first series FET and second series FET when, as part of the control sequence, the first series FET is OFF and the second series FET is ON in a positive half cycle of line hot or the first series FET is ON and the second series FET is OFF in a negative half cycle of line hot.

18. The electrical wiring device of claim 1, wherein the controller is configured to determine to which of the plurality of terminals line hot is connected based, at least, on the first sensor output and the second sensor output.

19. The electrical wiring device of claim 18, wherein the controller determines that line hot is connected to the HOT/LOAD terminal when, during a negative half cycle of line hot, the second sensor output indicates current flow through the NEUTRAL terminal or a voltage between the first series FET and the second series FET and the first sensor output indicates no current flow through the first series FET and the second series FET or no voltage at the one of the first traveler terminal or the second traveler terminal.

20. The electrical wiring device of claim 18, wherein the controller determines that line hot is connected to the one of the first traveler terminal or the second traveler terminal when, during a negative half cycle of line hot, the second sensor output indicates current flow through the NEUTRAL terminal or a voltage between the first series FET and the second series FET and the first sensor output indicates current flow through the first series FET and the second series FET or a voltage at the one of the first traveler terminal or the second traveler terminal.

21. The electrical wiring device of claim 1, further comprising a third sensor producing a third sensor output according to current flow through the HOT/LOAD terminal, wherein the controller is configured to determine to which of the plurality of terminals line hot is connected based, at least, on the first sensor output, the second sensor output, and the third sensor output.

22. The electrical wiring device of claim 21, wherein the controller determines to which of the plurality of terminals line hot is connected according to a look up table.

23. The electrical wiring device of claim 21, wherein the controller is further configured to turn the first series FET and the second series FET ON and to determine to which of the plurality of terminals a load is connected based, at least, on the first sensor output, the second sensor output, and the third sensor output while the first series FET and second series FET are ON.

24. The electrical wiring device of claim 23, wherein the controller determines to which of the plurality of terminals the load is connected according to a look up table.

25. An electrical wiring device comprising:
- a housing assembly including a plurality of terminals at least partially disposed therein, the plurality of terminals including a HOT/LOAD terminal, a NEUTRAL terminal, a first traveler terminal, and a second traveler terminal, wherein, when in use, at least one of the terminals is connected to line hot;
- at least one variable control mechanism coupled to the housing assembly, the at least one variable control mechanism being configured to adjustably select a user adjustable load setting, the user adjustable load setting being adjustable between a minimum setting and a maximum setting;
- a first series FET and a second series FET disposed in series between the HOT/LOAD terminal and one of the first traveler terminal or the second traveler terminal;
- at least one of a first sensor producing a first sensor output according to current flow or a voltage at the one of the first traveler terminal or the second traveler terminal and a second sensor producing a second sensor output according to current flow through the NEUTRAL terminal or according to a voltage between the first series FET and second series FET; and
- a controller configured to determine to which of the plurality of terminals line hot is connected and to provide, during operation, at least one of a first control signal to the first series FET and a second control signal to the second series FET according to the user adjustable load setting, wherein the first control signal and the second control signal are provided to the first series FET and the second series FET in accordance with a first dimming sequence or a second dimming sequence, based on, at least, to which of the plurality of terminals line is connected.

26. The electrical wiring device of claim 25, wherein the first dimming sequence and the second dimming sequence are each configured to eliminate or reduce current spikes in a load current.

27. The electrical wiring device of claim 26, wherein the first dimming sequence is selected if line hot is determined to be connected to the HOT/LOAD terminal, wherein, in the first dimming sequence, the first series FET is ON during at least a portion of a positive half cycle of line hot and the second series FET is ON during the positive half cycle.

28. The electrical wiring device of claim 26, wherein the second dimming sequence is selected if line hot is determined to be connected to one of the first traveler terminal or the second traveler terminal, wherein, in the second dimming sequence, the first series FET is ON during a positive half cycle of line hot and the second series FET is ON during at least a portion of the positive half cycle.

29. The electrical wiring device of claim 25, wherein the first control signal and the second control signal are the same.

30. The electrical wiring device of claim 25, wherein the controller is configured to determine to which of the plurality of terminals line hot is connected according to the output of at least one sensor.

* * * * *